US011528734B2

(12) United States Patent
Li et al.

(10) Patent No.: US 11,528,734 B2
(45) Date of Patent: Dec. 13, 2022

(54) UPLINK CONTROL INFORMATION TRANSMISSION METHOD AND DEVICE

(71) Applicant: Huawei Technologies Co., Ltd., Shenzhen (CN)

(72) Inventors: Shengyu Li, Beijing (CN); Lei Guan, Beijing (CN); Ruixiang Ma, Beijing (CN); Jiafeng Shao, Beijing (CN); Yongxia Lyu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 17/098,721

(22) Filed: Nov. 16, 2020

(65) Prior Publication Data

US 2021/0076405 A1  Mar. 11, 2021

Related U.S. Application Data

(63) Continuation of application No. PCT/CN2019/087414, filed on May 17, 2019.

(30) Foreign Application Priority Data

May 21, 2018 (CN) .......................... 201810490602.8

(51) Int. Cl.
*H04W 72/04* (2009.01)
*H04W 72/12* (2009.01)
(Continued)

(52) U.S. Cl.
CPC ...... *H04W 72/1284* (2013.01); *H04B 7/0456* (2013.01); *H04W 72/0446* (2013.01); *H04W 72/10* (2013.01); *H04W 72/1273* (2013.01)

(58) Field of Classification Search
CPC ........... B60L 2240/665; B60L 2260/22; B60L 53/22; B60L 58/12; B60L 58/18; B60L 8/003; H04B 7/0456; H04L 1/1854
See application file for complete search history.

(56) References Cited

U.S. PATENT DOCUMENTS

2017/0134140 A1  5/2017 Park
2017/0273056 A1*  9/2017 Papasakellariou .. H04W 72/042
(Continued)

FOREIGN PATENT DOCUMENTS

CN  102088344 A  6/2011
CN  103119884 A  5/2013
(Continued)

OTHER PUBLICATIONS

"HARQ-ACK Reporting for Aggregation of up to 32 Carriers," Agenda Item: 6.2.2.2.2.2, Source: InterDigital Communications, Document for: Discussion and Decision, 3GPP TSG-RAN WG1 Meeting #81, R1-153081, XP050967630, May 25-29, 2015, 4 pages.

(Continued)

*Primary Examiner* — Phuc H Tran
(74) *Attorney, Agent, or Firm* — Slater Matsil, LLP

(57) ABSTRACT

An uplink control information transmission method and a device, the device including a processor, and a memory storing a computer program for execution by the processor, the computer program including instructions for receiving physical downlink control channels (PDCCHs), where the PDCCHs are used to schedule physical downlink shared channels (PDSCHs), and where the PDCCHs comprise a PDCCH in a first PDCCH set and a PDCCH in a second PDCCH set, generating a first codebook and a second codebook, where the first codebook corresponds to the first PDCCH set, where the second codebook corresponds to the second PDCCH set, and where the first PDCCH set and the second PDCCH set correspond to different values of codebook identification information of the PDCCHs, and sending one or both of the first codebook and the second codebook.

20 Claims, 7 Drawing Sheets

(51) Int. Cl.
*H04B 7/0456* (2017.01)
*H04W 72/10* (2009.01)

(56) References Cited

U.S. PATENT DOCUMENTS

| 2017/0366322 A1 | 12/2017 | Ahn et al. |
| 2017/0373741 A1 | 12/2017 | Yang et al. |
| 2020/0228289 A1* | 7/2020 | He .................. H04L 5/001 |
| 2020/0382174 A1 | 12/2020 | Shao et al. |

FOREIGN PATENT DOCUMENTS

| CN | 107659387 A | 2/2018 |
| CN | 107925523 A | 4/2018 |
| CN | 108809524 A | 11/2018 |
| WO | 2016123372 A1 | 8/2016 |
| WO | 2017045499 A1 | 3/2017 |
| WO | 2018016794 A1 | 1/2018 |
| WO | 2018194436 A1 | 10/2018 |
| WO | 2019158074 A1 | 8/2019 |

OTHER PUBLICATIONS

"3rd Generation Partnership Project; Technical Specification Group Radio Access Network; NR; Multiplexing and channel coding (Release 15)," 3GPP TS 38.212 V15.1.1, Apr. 2018, 90 pages.
"3rd Generation Partnership Project; Technical Specification Group Radio Access Network; NR; Physical layer procedures for control (Release 15)," 3GPP TS 38.213 V15.1.0, Mar. 2018, 77 pages.
Jabi, M. et al., "Adaptive Cross-Packet HARQ," IEEE Transaction on Communications, vol. 65, No. 5, May 2017, 14 pages.
"Evaluations on 4Tx Codebook Enhancement for DL MIMO," Agenda Item: 6.2.2.1.1, Source: Fujitsu, Document for: Discussion and decision, 3GPP TSG RAN WG1 Meeting #73, R1-131927, Fukuoka, Japan, May 20-24, 2013, 4 pages.

* cited by examiner

UPLINK CONTROL INFORMATION TRANSMISSION METHOD AND DEVICE

CROSS-REFERENCE TO RELATED APPLICATIONS

This application is a continuation of International Patent Application No. PCT/CN2019/087414, filed on May 17, 2019, which claims priority to Chinese Patent Application No. 201810490602.8, filed on May 21, 2018. The disclosures of the aforementioned applications are hereby incorporated by reference in their entireties.

TECHNICAL FIELD

This application relates to the field of communications technologies, and in particular, to an uplink control information transmission method and a device.

BACKGROUND

A hybrid automatic repeat request (HARQ) is a technology combining a forward error correction (FEC) coding technology and an automatic repeat request (ARQ) technology. In FEC, a receive end can correct some errors by adding redundant information, to reduce retransmissions. For an error that cannot be corrected through FEC, the receive end requests, through an ARQ mechanism, a transmit end to retransmit data. Specifically, if the receive end can correctly parse the data sent by the transmit end, the receive end returns an acknowledgement (ACK) to the transmit end. If the receive end cannot correctly parse the data sent by the transmit end, the receive end returns a negative acknowledgement (NACK) to the transmit end, so that the transmit end retransmits the data.

Currently, in a new radio (NR) system, all ACKs/NACKs in one slot are jointly coded into one codebook, and are transmitted by using one physical uplink control channel (PUCCH) resource. For example, as shown in FIG. 1, a terminal can generate, at a start symbol location of an uplink slot 2, a NACK 1 corresponding to a PDSCH 1. However, because the NACK 1 can be fed back only after being jointly coded with an ACK 2 corresponding to a PDSCH 2, transmission of the NACK 1 is delayed. In addition, an access network device can send retransmitted data (that is, PDSCH 1 ReTX in FIG. 1) of the PDSCH 1 only after receiving information obtained after the NACK 1 and the ACK 2 are jointly coded. It can be learned that due to joint coding and transmission of ACK/NACK information in a same slot, ACK/NACK transmission flexibility may be reduced, and an ACK/NACK feedback latency may be increased. Further, when feedback of a NACK is delayed, a data retransmission latency of the access network device is increased. Consequently, it is unfavorable for the terminal to carry out an ultra-reliable low-latency communication (URLLC) service.

SUMMARY

This application provides an uplink control information transmission method and a device, to improve ACK/NACK transmission flexibility and reduce a feedback latency of ACK/NACK information.

To achieve the foregoing objective, the following technical solutions are used in this application.

According to a first aspect, an uplink control information transmission method is provided. The method includes A terminal receives physical downlink control channels (PDCCH), where the PDCCHs are used to schedule physical downlink shared channels (PDSCH), and the PDCCHs include a first PDCCH set and a second PDCCH set. Then, the terminal generates a first codebook and a second codebook, where the first codebook corresponds to the first PDCCH set, the second codebook corresponds to the second PDCCH set, and the first PDCCH set and the second PDCCH set correspond to different values of codebook identification information of the PDCCHs. Finally, the terminal sends the first codebook and/or the second codebook.

According to the uplink control information transmission method provided in this embodiment of this application, if the terminal receives a plurality of PDCCHs that are used to schedule PDSCHs, the terminal may generate the first codebook and the second codebook based on ACKs/NACKs triggered by the PDSCHs scheduled by the PDCCHs, to feed back a plurality of ACKs/NACKs in groups, thereby improving ACK/NACK transmission flexibility and reducing a feedback latency of ACK/NACK information.

In a possible design, that the terminal sends the first codebook and/or the second codebook includes The terminal sends the first codebook and/or the second codebook in a first time unit, where the first time unit is associated with the first PDCCH set, and the first time unit is associated with the second PDCCH set. In this way, compared with a current standard in which a terminal can feed back only one codebook in one time unit, in the uplink control information transmission method provided in this embodiment of this application, the terminal can feed back one or two codebooks in one time unit, thereby reducing an ACK/NACK feedback latency.

That the first time unit is associated with the first PDCCH set may be understood as that the first time unit is a time unit in which corresponding ACKs/NACKs are fed back for PDSCHs scheduled by PDCCHs in the first PDCCH set. In other words, for any PDCCH in the first PDCCH set, an index of a time unit in which the PDCCH is located plus a first timing offset K0 and a second timing offset K1 is equal to an index of the first time unit. The first timing offset K0 is a difference between indexes of a time unit in which the PDSCH scheduled by the PDCCH is located and the time unit in which the PDCCH is located, and the second timing offset K1 is a difference between indexes of a time unit in which the corresponding ACK/NACK is fed back for the PDSCH scheduled by the PDCCH and the time unit in which the PDSCH scheduled by the PDCCH is located.

For related descriptions regarding that the first time unit is associated with the second PDCCH set, refer to the foregoing content. Details are not described again in this embodiment of this application.

Optionally, the codebook identification information includes at least one or any combination of the following: an acknowledgement/negative acknowledgement resource indicator (ACK/NACK resource indicator, ARI), downlink control information (DCI) format, a radio network temporary identifier (RNTI), first indication information of DCI, a PDCCH monitoring occasion, a search space identifier (SS ID), and a control resource set identifier (CORESET ID).

In a possible design, that the first PDCCH set and the second PDCCH set correspond to different values of codebook identification information of the PDCCHs includes a value of codebook identification information of each PDCCH in the first PDCCH set is a first preset value, a value of codebook identification information of each PDCCH in the second PDCCH set is a second preset value, and the first preset value is different from the second preset value. The first preset value and the second preset value are two values configured by a higher layer or predefined, or the first preset value and the second preset value are any two different preset values in a plurality of preset values configured by a higher layer or predefined.

In a possible design, that the first PDCCH set and the second PDCCH set correspond to different values of codebook identification information of the PDCCHs includes a value of codebook identification information of each PDCCH in the first PDCCH set belongs to a first value set, a value of codebook identification information of each PDCCH in the second PDCCH set belongs to a second value set, and the value in the first value set is different from the value in the second value set.

In a possible design, a reference resource corresponding to a PDCCH in the first PDCCH set and a reference resource corresponding to a PDCCH in the second PDCCH set do not overlap in time domain, when the first PDCCH set includes at least two PDCCHs, reference resources corresponding to the PDCCHs in the first PDCCH set overlap in time domain, when the second PDCCH set includes at least two PDCCHs, reference resources corresponding to the PDCCHs in the second PDCCH set overlap in time domain, and the reference resources are determined based on codebook identification information of the PDCCHs.

Optionally, the first codebook is generated based on downlink assignment index (DAI) information of each PDCCH in the first PDCCH set, and the second codebook is generated based on DAI information of each PDCCH in the second PDCCH set.

In a possible design, the method further includes determining a first uplink resource based on a quantity of bits of the first codebook and a first ARI value corresponding to the first codebook, where the first ARI value is a value of an ARI corresponding to a last received PDCCH in the first PDCCH set, and determining a second uplink resource based on a quantity of bits of the second codebook and a second ARI value corresponding to the second codebook, where the second ARI value is a value of an ARI corresponding to a last received PDCCH in the second PDCCH set.

In a possible design, if the first uplink resource and the second uplink resource do not overlap in time domain, the terminal sends the first codebook on the first uplink resource, and sends the second codebook on the second uplink resource.

In a possible design, if the first uplink resource and the second uplink resource do not overlap in time domain, the first uplink resource and a third uplink resource do not overlap in time domain, and the second uplink resource and the third uplink resource overlap in time domain, the terminal sends the first codebook on the first uplink resource, and sends the second codebook on the second uplink resource, or sends fourth uplink information on a fourth uplink resource, or sends third uplink information on the third uplink resource, where the fourth uplink information is generated by jointly coding the second codebook and the third uplink information corresponding to the third uplink resource, and the fourth uplink resource and the first uplink resource do not overlap in time domain.

In a possible design, if the first uplink resource and the second uplink resource do not overlap in time domain, the first uplink resource and a third uplink resource overlap in time domain, and the second uplink resource and the third uplink resource overlap in time domain, the terminal sends the first codebook on the first uplink resource, and sends the second codebook on the second uplink resource, or the terminal sends fifth uplink information on a fifth uplink resource, where the fifth uplink information is generated by jointly coding the first codebook, the second codebook, and third uplink information corresponding to the third uplink resource.

In a possible design, if the first uplink resource and the second uplink resource overlap in time domain, the terminal sends the first codebook on the first uplink resource, or the terminal sends the second codebook on the second uplink resource, or the terminal sends sixth uplink information on a sixth uplink resource, where the sixth uplink information is generated by jointly coding the first codebook and the second codebook.

According to a second aspect, an uplink control information transmission method is provided. The method includes an access network device sends physical downlink control channels PDCCHs, where the PDCCHs are used to schedule a physical downlink shared channels PDSCHs, and the PDCCHs include a first PDCCH set and a second PDCCH set. Then, the access network device receives a first codebook and/or a second codebook, where the first codebook corresponds to the first PDCCH set, the second codebook corresponds to the second PDCCH set, and the first PDCCH set and the second PDCCH set correspond to different values of codebook identification information of the PDCCHs. According to the uplink control information transmission method provided in this embodiment of this application, the access network device sends a plurality of PDCCHs to a terminal, and then the access network device may receive the first codebook and the second codebook that are sent by the terminal. In this process, the terminal generates the first codebook and the second codebook based on ACKs/NACKs triggered by PDSCHs scheduled by the PDCCHs sent by the access network device, to feed back a plurality of ACKs/NACKs in groups, thereby improving ACK/NACK transmission flexibility and reducing an ACK/NACK feedback latency.

In a possible design, that the access network device receives the first codebook and/or the second codebook includes the access network device receives the first codebook and/or the second codebook in a first time unit, where the first time unit is associated with the first PDCCH set, and the first time unit is associated with the second PDCCH set. In this way, compared with a current standard in which an access network device can receive, in one time unit, only one codebook fed back by a terminal, in the uplink control information transmission method provided in this embodiment of this application, the access network device can receive, in one time unit, one or two codebooks fed back by the terminal, thereby reducing an ACK/NACK feedback latency.

Optionally, the codebook identification information includes at least one or any combination of the following: an ARI, a DCI format, a radio network temporary identifier, first indication information of DCI, a PDCCH monitoring occasion, a search space identifier, and a control resource set identifier.

In a possible design, that the first PDCCH set and the second PDCCH set correspond to different values of codebook identification information of the PDCCHs includes a value of codebook identification information of each PDCCH in the first PDCCH set is a first preset value, a value of codebook identification information of each PDCCH in the second PDCCH set is a second preset value, and the first preset value is different from the second preset value.

In a possible design, that the first PDCCH set and the second PDCCH set correspond to different values of codebook identification information of the PDCCHs includes a value of codebook identification information of each PDCCH in the first PDCCH set belongs to a first value set, a value of codebook identification information of each PDCCH in the second PDCCH set belongs to a second value set, and the value in the first value set is different from the value in the second value set.

Optionally, the first codebook is generated based on downlink assignment index DAI information of each PDCCH in the first PDCCH set, and the second codebook is generated based on DAI information of each PDCCH in the second PDCCH set.

In a possible design, the method further includes the access network device determines a first uplink resource based on a quantity of bits of the first codebook and a first ARI value corresponding to the first codebook, where the first ARI value is a value of an ARI corresponding to a last received PDCCH in the first PDCCH set, and determines a second uplink resource based on a quantity of bits of the second codebook and a second ARI value corresponding to the second codebook, where the second ARI value is a value of an ARI corresponding to a last received PDCCH in the second PDCCH set.

In a possible design, if the first uplink resource and the second uplink resource do not overlap in time domain, the access network device receives the first codebook on the first uplink resource, and receives the second codebook on the second uplink resource.

In a possible design, if the first uplink resource and the second uplink resource overlap in time domain, the access network device receives the first codebook on the first uplink resource, or the access network device receives the second codebook on the second uplink resource, or the access network device receives sixth uplink information on a sixth uplink resource, where the sixth uplink information is generated by jointly coding the first codebook and the second codebook.

According to a third aspect, a terminal is provided. The terminal has a function of implementing the method according to any design of the first aspect. The function may be implemented by hardware, or may be implemented by executing corresponding software by hardware. The hardware or the software includes one or more modules corresponding to the function.

According to a fourth aspect, a terminal is provided. The terminal includes a processor, a memory, a bus, and a communications interface, where the memory is configured to store a computer executable instruction, the processor and the memory are connected through the bus, and when the terminal is run, the processor executes the computer executable instruction stored in the memory, so that the terminal performs the uplink control information transmission method according to any design of the first aspect.

According to a fifth aspect, a terminal is provided. The terminal includes a processor, where the processor is configured to couple to a memory, read an instruction stored in the memory, and perform, according to the instruction, the uplink control information transmission method according to any design of the first aspect.

According to a sixth aspect, a computer-readable storage medium is provided. The computer-readable storage medium stores an instruction. When the instruction is run on a computer, the computer is enabled to perform the uplink control information transmission method according to any design of the first aspect.

According to a seventh aspect, a computer program product including an instruction is provided. When the computer program product runs on a computer, the computer is enabled to perform the uplink control information transmission method according to any design of the first aspect.

According to an eighth aspect, a chip system is provided. The chip system includes a processor, configured to support a terminal in implementing the functions in the first aspect. In a possible design, the chip system further includes a memory. The memory is configured to store a program instruction and data that are necessary for the terminal. The chip system may include a chip, or may include a chip and another discrete component.

For technical effects brought by any design manner of the third aspect to the eighth aspect, refer to technical effects brought by the different design manners of the first aspect. Details are not described herein again.

According to a ninth aspect, an access network device is provided. The access network device has a function of implementing the method according to any design of the second aspect. The function may be implemented by hardware, or may be implemented by executing corresponding software by hardware. The hardware or the software includes one or more modules corresponding to the function.

According to a tenth aspect, an access network device is provided. The access network device includes a processor, a memory, a bus, and a communications interface, where the memory is configured to store a computer executable instruction, the processor and the memory are connected through the bus, and when the access network device is run, the processor executes the computer executable instruction stored in the memory, so that the access network device performs the uplink control information transmission method according to any design of the second aspect.

According to an eleventh aspect, an access network device is provided. The access network device includes a processor, where the processor is configured to couple to a memory, read an instruction stored in the memory, and perform, according to the instruction, the uplink control information transmission method according to any design of the second aspect.

According to a twelfth aspect, a computer-readable storage medium is provided. The computer-readable storage medium stores an instruction. When the instruction is run on a computer, the computer is enabled to perform the uplink control information transmission method according to any design of the second aspect.

According to a thirteenth aspect, a computer program product including an instruction is provided. When the computer program product runs on a computer, the computer is enabled to perform the uplink control information transmission method according to any design of the second aspect.

According to a fourteenth aspect, a chip system is provided. The chip system includes a processor, configured to support an access network device in implementing the functions in the second aspect. In a possible design, the chip system further includes a memory. The memory is configured to store a program instruction and data that are necessary for the access network device. The chip system may include a chip, or may include a chip and another discrete component.

For technical effects brought by any design manner of the ninth aspect to the fourteenth aspect, refer to technical effects brought by the different design manners of the second aspect. Details are not described herein again.

According to a fifteenth aspect, a communications system is provided. The communications system includes a network device and a terminal, where the terminal is configured to perform the method in any design of the first aspect, and the network device is configured to perform the method in any design of the second aspect.

DETAILED DESCRIPTION OF ILLUSTRATIVE EMBODIMENTS

Figure 1:
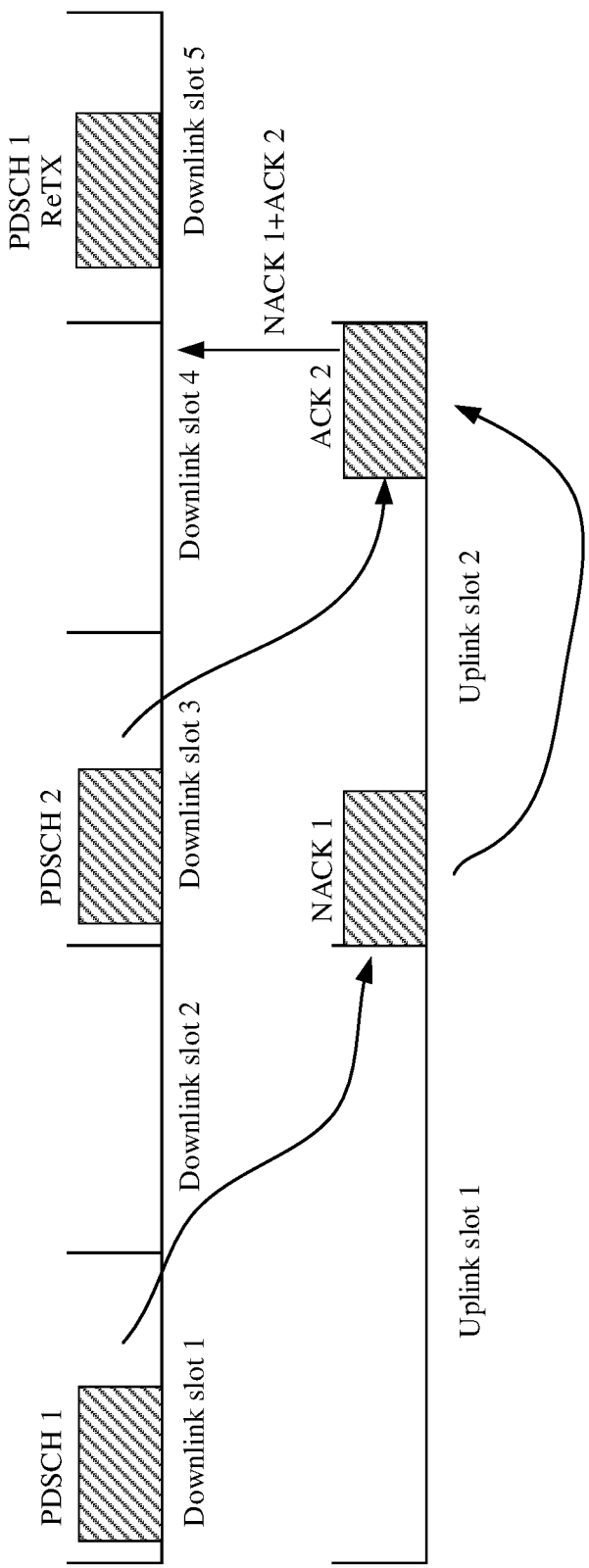
FIG. 1 is a schematic diagram of an ACK/NACK feedback in a current NR standard.

In this application, the terms "first", "second", and the like are merely used to distinguish different objects, but not limit a sequence thereof. For example, a first route and a second route are merely used to distinguish different routes, and a sequence of the first route and the second route is not limited.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be noted that, in this application, the word "example" or "for example" is used to represent giving an example, an illustration, or a description. Any embodiment or design scheme described as "example" or "for example" in this application should not be interpreted as being more preferred or having more advantages than another embodiment or design scheme. Exactly, use of the word "example", "for example", or the like is intended to present a related concept in a specific manner.

In addition, a network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that as network architectures evolve and a new service scenario emerges, the technical solutions provided in the embodiments of this application are also applicable to similar technical problems.

Before a method provided in the embodiments of this application is described, related terms in the embodiments of this application are first briefly described.

(1) A time unit includes at least one time interval (TI) in time domain. The TI herein may be a transmission time interval (TTI) in an long term evolution (LTE) system, may be a symbol-level short TTI, may be a short TTI with a large subcarrier spacing in a high-frequency system, or may be a slot, a mini-slot, an orthogonal frequency division multiplexing (OFDM) symbol, or the like in a $5^{th}$ generation (5G) system. This is not limited in the embodiments of this application.

(2) Time-domain overlapping means that two resources (for example, PUCCH resources) include at least a same time subunit in time domain. A length of the time subunit is less than that of a time unit, and the time subunit may be a symbol, a mini-slot, an sTTI, or the like. Time-domain overlapping includes complete overlapping and partial overlapping in time domain.

(3) Carrier aggregation (CA) is to aggregate spectrums of two or more component carriers to obtain a higher transmission bandwidth. Spectrums of the component carriers may be adjacent continuous spectrums, may be non-adjacent spectrums in a same frequency band or even discontinuous spectrums in different frequency bands. A terminal may transmit or receive data by using a plurality of component carriers at the same time according to a capability and a service requirement of the terminal. For example, an access network device may send information to the terminal on a same time unit through a carrier 1 and a carrier 2 and through a plurality of transport blocks (TB), a plurality of code blocks (CB), or a plurality of code block groups (CB group, CBG). One CBG includes one or more CBs. One TB includes one or more CBs, or may include one or more CBGs.

(4) A higher-layer configuration is a configuration indicated by higher-layer configuration signaling. The higher-layer configuration signaling may be configuration signaling sent by a higher protocol layer. The higher protocol layer is at least one of a plurality of protocol layers above a physical layer. For example, the higher protocol layer may be specifically at least one of the following protocol layers: a medium access control (MAC) layer, a radio link control (RLC) layer, a packet data convergence protocol (PDCP) layer, a radio resource control (RRC) layer, and a non-access stratum (NAS).

An uplink control information transmission method provided in this application may be applied to various communications systems, for example, a 5G communications system, a future evolved system, or a plurality of converged communications systems. The technical solutions provided in this application may be applied to a plurality of application scenarios, for example, scenarios such as machine to machine (M2M), macro-micro communication, enhanced mobile broadband (eMBB), URLLC, and massive machine-type communications (mMTC). These scenarios may include but are not limited to a scenario of communication between communications devices, a scenario of communication between network devices, a scenario of communication between a network device and a communications device, and the like.

Figure 2:
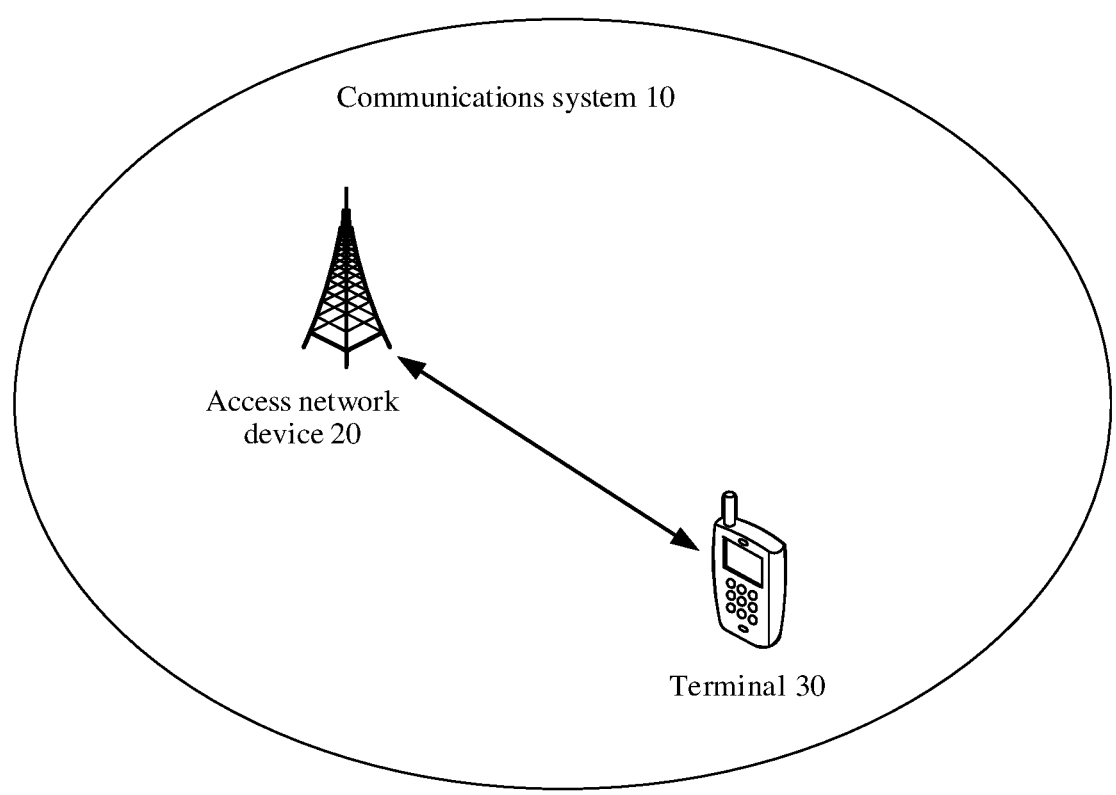
FIG. 2 is a schematic diagram of a communications system according to an embodiment of this application.

FIG. 2 is a schematic diagram of a communications system 10 to which the technical solutions provided in this application are applicable. The communications system 10 includes an access network device 20 and a terminal 30.

The access network device 20 may be a base station, a base station controller, or the like in wireless communication. For example, the base station may be a base transceiver station (BTS) in global system for mobile communications (GSM) or code division multiple access (CDMA), or may be a NodeB in wideband code division multiple access (WCDMA), or may be an evolved NodeB (evolutional Node B, eNB or e-NodeB) in LTE, or the like. Alternatively, the base station may be an eNB in an Internet of things (IoT) or a narrowband Internet of things (Narrow Band-Internet of Things, NB-IoT). This is not specifically limited in the embodiments of this application. Certainly, the access network device 20 may alternatively be a device in another network, for example, may be a network device in a 5G mobile communications network or a future evolved public land mobile network (PLMN).

The terminal 30 provides a voice and/or a data connectivity service for a user, and for example, may be user equipment (UE), an access terminal, a terminal unit, a terminal station, a mobile station, a mobile console, a remote station, a remote terminal, a mobile device, a wireless communications device, a terminal agent, or a terminal apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a communications device in a future 5G network, a communications device in a future evolved public land mobile network (PLMN), or the like. This is not limited in the embodiments of this application.

Figure 3:
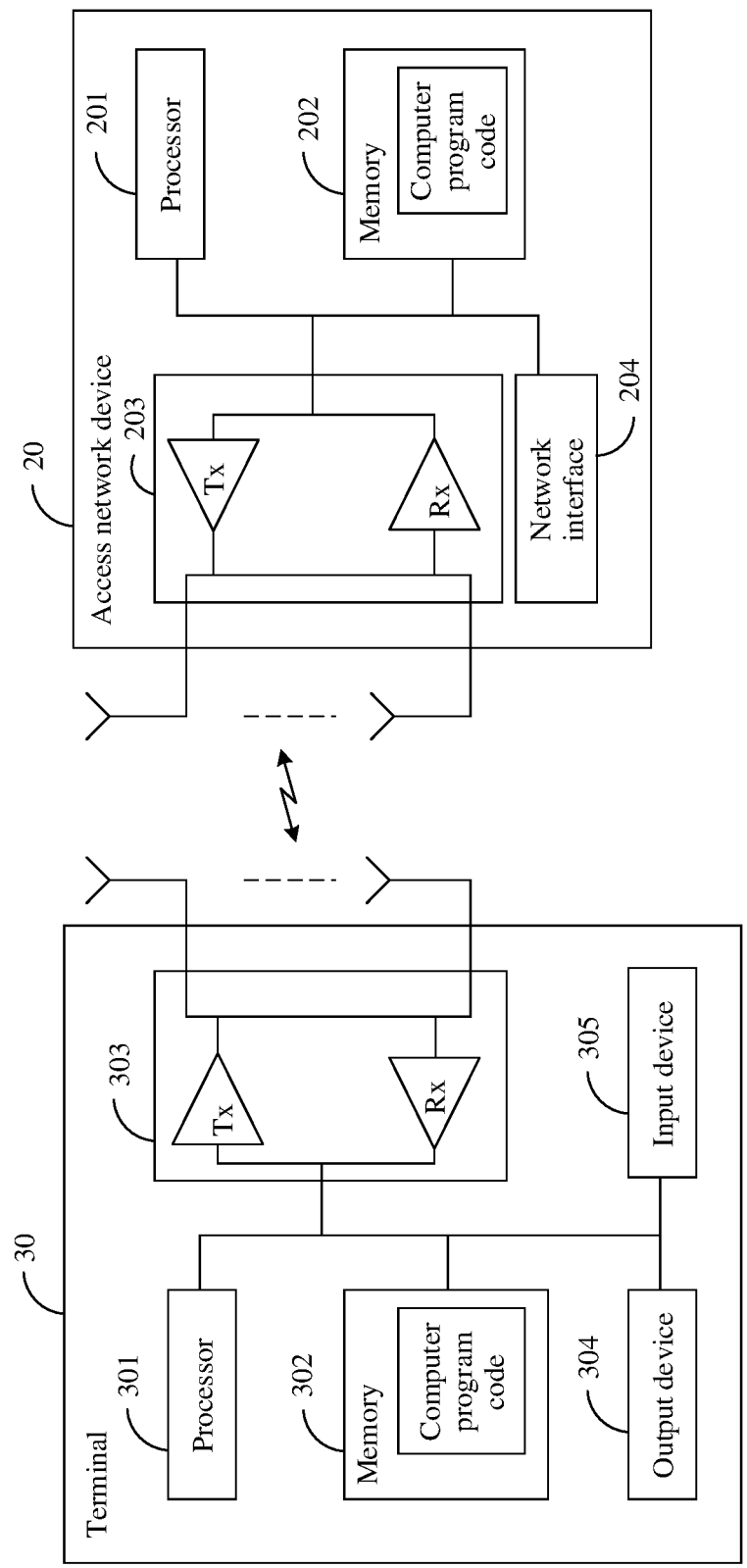
FIG. 3 is a schematic diagram of a hardware structure of a terminal device according to an embodiment of this application.

FIG. 3 is a schematic diagram of a hardware structure of an access network device 20 and a terminal 30 according to an embodiment of this application.

The terminal 30 includes at least one processor 301, at least one memory 302, and at least one communications interface 303. Optionally, the terminal 30 may further include an output device 304 and an input device 305.

The processor 301, the memory 302, and the communications interface 303 are connected through a bus. The processor 301 may be a general-purpose central processing unit (CPU), a microprocessor, an application-specific integrated circuit (ASIC), or one or more integrated circuits configured to control program execution in the solutions of this application. The processor 301 may alternatively include a plurality of CPUs, and the processor 301 may be a single-CPU processor or a multi-CPU processor. The processor herein may refer to one or more devices, circuits, or processing cores configured to process data (for example, a computer program instruction).

The memory 302 may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or another optical disk storage, an optical disc storage (including a compressed optical disc, a laser disc, an optical disc, a digital versatile optical disc, a Blu-ray disc, and the like), a magnetic disk storage medium or another magnetic storage device, or any other medium that can carry or store expected program code in a form of an instruction or a data structure and that can be accessed by a computer, but is not limited to this. The memory 302 may exist independently, and is connected to the processor 301 through the bus. The memory 302 may alternatively be integrated with the processor 301. The memory 302 is configured to store application program code for performing the solutions in this application, and the processor 301 controls execution of the application program code. The processor 301 is configured to execute computer program code stored in the memory 302, to implement the uplink control information transmission method in the embodiments of this application.

The communications interface 303 may be an apparatus using any type of communications interface, and is configured to communicate with another device or a communications network such as the Ethernet, a radio access network (Radio Access Network, RAN), or a wireless local area network (WLAN). The communications interface 303 includes a transmitter (Tx) and a receiver (Rx).

The output device 304 communicates with the processor 301, and may display information in various manners. For example, the output device 304 may be a liquid crystal display (LCD), a light emitting diode (LED) display device, a cathode ray tube (CRT) display device, or a projector. The input device 305 communicates with the processor 301, and may receive an input of a user in various manners. For example, the input device 305 may be a mouse, a keyboard, a touchscreen device, or a sensing device.

The access network device 20 includes at least one processor 201, at least one memory 202, at least one communications interface 203, and at least one network interface 204. The processor 201, the memory 202, the communications interface 203, and the network interface 204 are connected through a bus. The network interface 204 is configured to connect to a core network device via a link (for example, an S1 interface), or connect to a network interface of another access network device via a wired or wireless link (for example, an X2 interface) (not shown in the figure). This is not specifically limited in the embodiments of this application. In addition, for related descriptions of the processor 201, the memory 202, and the communications interface 203, refer to descriptions of the processor 301, the memory 302, and the communications interface 303 in the terminal 30. Details are not described herein again.

Figure 4:
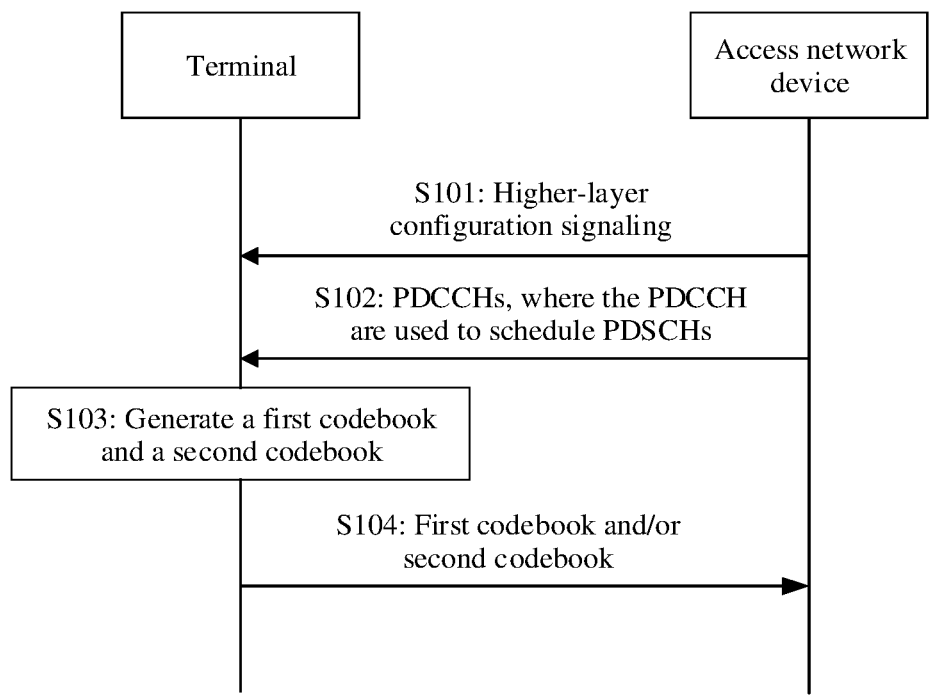
FIG. 4 is a flowchart of an uplink control information transmission method according to an embodiment of this application.

FIG. 4 is a flowchart of an uplink control information transmission method according to an embodiment of this application. The method includes the following steps.

S101: A terminal receives higher-layer configuration signaling sent by an access network device.

The higher-layer configuration signaling includes various configuration parameters, for example, a downlink (DL) subcarrier spacing (SCS), an uplink (UL) SCS, and configuration information of a PUCCH resource set for carrying an ACK/NACK.

S102: The terminal receives PDCCHs sent by the access network device, where the PDCCHs are used to schedule PDSCHs.

Optionally, the terminal receives the PDCCHs on various PDCCH monitoring occasions. It should be noted that the terminal determines all PDCCH monitoring occasions in a time unit based on a PDCCH monitoring period, an offset, and a monitoring pattern.

Optionally, the PDCCHs received by the terminal include a first PDCCH set and a second PDCCH set. In other words, the PDCCHs received by the terminal include a plurality of PDCCHs in one or more time units, and these PDCCHs respectively belong to the first PDCCH set or the second PDCCH set.

In some embodiments of this application, the first PDCCH set and the second PDCCH set correspond to different values of codebook identification information. The codebook identification information is used to determine a PDCCH set to which the PDCCH belongs. The codebook identification information includes at least one or any combination of the following: an ARI, a DCI format, an RNTI, first indication information of DCI, a PDCCH monitoring occasion, an SS ID, and a CORESET ID. The codebook identification information may alternatively be another parameter. This is not limited in this embodiment of this application.

Optionally, a value of codebook identification information of each PDCCH in the first PDCCH set is a first preset value, and a value of codebook identification information of each PDCCH in the second PDCCH set is a second preset value. In other words, if a value of codebook identification information of a PDCCH is the first preset value, the PDCCH belongs to the first PDCCH set. If a value of codebook identification information of a PDCCH is the second preset value, the PDCCH belongs to the second PDCCH set. The first preset value is different from the second preset value. The first preset value and the second preset value are two values configured by a higher layer or predefined, or the first preset value and the second preset value are any two different preset values in a plurality of preset values configured by a higher layer or predefined.

Optionally, a value of codebook identification information of each PDCCH in the first PDCCH set belongs to a first value set, and a value of codebook identification information of each PDCCH in the second PDCCH set belongs to a second value set. In other words, if a value of codebook identification information of a PDCCH belongs to the first value set, the PDCCH belongs to the first PDCCH set. If a value of codebook identification information of a PDCCH belongs to the second value set, the PDCCH belongs to the second PDCCH set. A value in the first value set is different from a value in the second value set. The first value set and the second value set are configured by a higher layer or predefined.

Optionally, a value of codebook identification information of each PDCCH in the first PDCCH set is greater than (or greater than or equal to) a third preset value, and a value of codebook identification information of each PDCCH in the second PDCCH set is less than or equal to (or less than) the third preset value. In other words, if the value of the codebook identification information is greater than (or greater than or equal to) the third preset value, the value of the codebook identification information belongs to the first value set. If the value of the codebook identification information is less than or equal to (or less than) the third preset value, the value of the codebook identification information belongs to the second value set. In this way, if a value of codebook identification information of a PDCCH is greater than (or greater than or equal to) the third preset value, the PDCCH belongs to the first PDCCH set. If a value of codebook identification information of a PDCCH is less than or equal to (or less than) the third preset value, the PDCCH belongs to the second PDCCH set.

The following provides specific descriptions by using an example in which the codebook identification information is the ARI. It is assumed that a bit-width of the ARI is configured as 3 by a higher layer, and the ARI includes eight values, respectively 000, 001, . . . , and 111. Assuming that the first preset value and the second preset value are any two different values of the eight ARI values configured by the higher layer, and ARIs of a PDCCH 1, a PDCCH 2, a PDCCH 3, and a PDCCH 4 are respectively 001, 011, 011, and 001, the first PDCCH set is {PDCCH, PDCCH 4}, and the second PDCCH set is {PDCCH 2, PDCCH 3}. Alternatively, assuming that the first value set is {000, 001, 100, 101}, and the second value set is {010, 011, 110, 111}, and ABIs of a PDCCH 1, a PDCCH 2, a PDCCH 3 and a PDCCH 4 are respectively 001, 010, 101, and 111, the first PDCCH set is {PDCCH 1, PDCCH 3}, and the second PDCCH set is {PDCCH 2, PDCCH 3}.

The following provides specific descriptions by using an example in which the codebook identification information is the DCI format. It should be noted that the DCI format is mainly used to indicate a function of DCI carried by the PDCCH. After receiving the PDCCH, the terminal determines a DCI quantity of bits of the PDCCH through cyclic redundancy check (Cyclic Redundancy Check, CRC), and determines the DCI format of the PDCCH with reference to a format indicator byte in DCI obtained after the PDCCH is decoded. It is assumed that the DCI format used to schedule downlink data transmission is configured to include the following values: a format 1_0, a format 1_1, and a format 1_x. In this embodiment of this application, the format 1_x is one or more new DCI formats different from the format 1_0 and the format 1_1 that are specified in a current standard. It should be noted that the format 1_x has a quantity of bits different from those in the format 1_0 and the format 1_1. It is assumed that the first value set is {format 1_0, format 1_1}, and the second value set is {format 1_x}. In this case, if a DCI format of a PDCCH is the format 1_0 or the format 1_1, the PDCCH belongs to the first PDCCH set. If a DCI format of a PDCCH is the format 1_x, the PDCCH belongs to the second PDCCH set.

The following provides specific descriptions by using an example in which the codebook identification information is the RNTI. It should be noted that the RNTI is used to scramble the DCI in the PDCCH. The terminal may perform descrambling processing on the DCI by testing different RNTI values, to determine an RNTI value corresponding to the DCI. It is assumed that an RNTI corresponding to the DCI in the PDCCH that is configured by a higher layer and that is used to schedule downlink data transmission includes the following types: a cell (cell, C)-RNTI, a paging (Paging, P)-RNTI, a system information (System Information, SI)-RNTI, an X-RNTI, and the like. In this embodiment of this application, the X-RNTI is one or more new-type RNTIs. Optionally, the X-RNTI is used to indicate a service corresponding to data of a PDSCH scheduled by the PDCCH. For example, the service is a URLLC service. RNTIs of different types correspond to different values. In other words, the C-RNTI, the P-RNTI, the SI-RNTI, and the X-RNTI correspond to different values. It is assumed that the first value set includes a value of the C-RNTI, a value of the P-RNTI, and a value of the SI-RNTI, and the second value set includes a value of the X-RNTI. If a value of an RNTI corresponding to a PDCCH is the value of the C-RNTI, the value of the P-RNTI, or the value of the SI-RNTI, the PDCCH belongs to the first PDCCH set. If a value of an RNTI corresponding to a PDCCH is the value of the X-RNTI, the PDCCH belongs to the second PDCCH set.

The following provides specific descriptions by using an example in which the codebook identification information is the first indication information of the DCI. The first indication information of the DCI is used to determine a PDCCH set to which the PDCCH belongs. In an optional implementation, if a value of first indication information of DCI in a PDCCH is the first preset value, the PDCCH belongs to the first PDCCH set. If a value of first indication information of DCI in a PDCCH is the second preset value, the PDCCH belongs to the second PDCCH set. For another example, if a value of first indication information of DCI in a PDCCH belongs to the first value set, the PDCCH belongs to the first PDCCH set. If a value of first indication information of DCI in a PDCCH belongs to the second value set, the PDCCH belongs to the second PDCCH set. In another optional implementation, if there is first indication information of DCI in a PDCCH, the PDCCH belongs to the first PDCCH set. If there is no first indication information of DCI in a PDCCH, the PDCCH belongs to the second PDCCH set.

Optionally, the first indication information of the DCI may be other indication information of the DCI, or the first indication information of the DCI further has another function. Specifically, there are the following cases for the first indication information of the DCI.

(1) The first indication information of the DCI is DCI format indication information, or some bits in DCI format indication information. In this case, the first indication information of the DCI is further used to indicate the DCI format of the PDCCH. For example, when a value of the first indication information of the DCI is the first preset value, the DCI format of the PDCCH is a format 1_0 or a format 1_1, and the PDCCH belongs to the first PDCCH set. When a value of the first indication information of the DCI is the second preset value, the DCI format of the PDCCH is a format 1_x, and the PDCCH belongs to the second PDCCH set.

(2) The first indication information of the DCI is a TimeDomainResourceAllocation byte. It should be noted that, in a current standard, the TimeDomainResourceAllocation byte is used to indicate information such as PDCCH-to-PDSCH-Timing K0, a start and length indicator value (SLIV) of a PDSCH, and a mapping type of the PDSCH. The PDCCH-to-PDSCH-Timing K0 is used to indicate an index offset between a time unit in which the PDCCH is located and a time unit in which the PDSCH scheduled by the PDCCH is located. The SLIV is used to indicate a number of a start symbol of the PDSCH and a time domain length. The PDSCH mapping type is used to indicate a time domain location of a demodulation reference signal (DMRS) in the PDSCH. When the first indication information of the DCI is the TimeDomainResourceAllocation byte (that is, the TimeDomainResourceAllocation byte further indicates a PDCCH set to which the PDCCH belongs), for a value of each group of TimeDomainResourceAllocation bytes, a corresponding group of {K0, SLIV, mapping type, PDCCH group ID} is configured by a higher layer. The PDCCH group ID is used to indicate the PDCCH set to which the PDCCH belongs.

(3) The first indication information of the DCI is further used to directly indicate a service type of the PDSCH scheduled by the PDCCH, or the first indication information of the DCI is further used to directly indicate whether the PDSCH scheduled by the PDCCH can be preempted. For example, when the DCI of the PDCCH includes the first indication information, it indicates that a service type of the PDSCH scheduled by the PDCCH is a URLLC service or that the PDSCH scheduled by the PDCCH cannot be preempted. For another example, when a value of the first indication information in the DCI of the PDCCH is the first preset value, it indicates that the PDSCH scheduled by the PDCCH is a URLLC service or that the PDSCH scheduled by the PDCCH cannot be preempted.

(4) The first indication information of the DCI is further used to indirectly indicate the service type of the PDSCH scheduled by the PDCCH. For example, the first indication information of the DCI is HARQ-ACK timing K1 in a PDSCH-to-HARQ-Timing byte. When K1 is less than (or less than or equal to) a preset value, a service type of the corresponding PDSCH scheduled by the PDCCH is a URLLC service.

The following provides specific descriptions by using an example in which the codebook identification information is the PDCCH monitoring occasion. Assuming that PDCCHs are sent at seven locations: symbols 0, 2, 4, 6, 8, 10, and 12 in each slot, the first value set is {0, 2, 4, 6}, and the second value set is {8, 10, 12}, if a PDCCH monitoring occasion of a PDCCH is the symbol 0, 2, 4, or 6, the PDCCH belongs to the first PDCCH set, or if a PDCCH monitoring occasion of a PDCCH is the symbol 8, 10, or 12, the PDCCH belongs to the second PDCCH set.

The following provides specific descriptions by using an example in which the codebook identification information is the SS ID. It should be noted that each SS ID corresponds to one SS, and each SS is associated with a group of parameters, for example, an aggregation level, times of blind detection, a PDCCH monitoring period, a PDCCH monitoring offset, and a PDCCH monitoring pattern. In an optional implementation, SS IDs of PDCCHs that are intended to be blindly detected by the terminal are divided into two groups. A first group of SS IDs corresponds to the first PDCCH set, and a second group of SS IDs corresponds to the second PDCCH set. In other words, if an SS ID of a PDCCH belongs to the first group of SS IDs, the PDCCH belongs to the first PDCCH set. If an SS ID of a PDCCH belongs to the second group of SS IDs, the PDCCH belongs to the second PDCCH set. In another optional implementation, the terminal may determine an SS by using the SS ID corresponding to the PDCCH, and further determine the PDCCH monitoring period and the PDCCH monitoring pattern based on the SS. The terminal then determines a PDCCH monitoring density based on the PDCCH monitoring period and the PDCCH monitoring pattern. The PDCCH monitoring density is used to indicate how many times that the PDCCH monitoring occasion appears in one time unit. In this way, the terminal may determine, based on the PDCCH monitoring density, a PDCCH set to which a PDCCH belongs. For example, when the PDCCH monitoring density is greater than (or greater than or equal to) the third preset value, it indicates that the PDCCH in the corresponding SS meets a low-latency scheduling requirement. Optionally, the PDCCH in the corresponding SS belongs to the first PDCCH set. On the contrary, when the PDCCH monitoring density is less than or equal to (or less than) a preset value, it indicates that a scheduling latency of the PDCCH in the corresponding SS is relatively high. Optionally, the PDCCH in the corresponding SS belongs to the second PDCCH set.

In some embodiments of this application, the terminal may divide a plurality of PDCCHs into the first PDCCH set and the second PDCCH set based on a time-domain overlapping status of reference resources corresponding to the plurality of PDCCHs.

Optionally, a reference resource corresponding to a PDCCH in the first PDCCH set and a reference resource corresponding to a PDCCH in the second PDCCH set do not overlap in time domain, when the first PDCCH set includes at least two PDCCHs, reference resources corresponding to the PDCCHs in the first PDCCH set overlap in time domain, when the second PDCCH set includes at least two PDCCHs, reference resources corresponding to the PDCCHs in the second PDCCH set does not overlap in time domain, and the reference resources are determined based on codebook identification information of the PDCCHs.

It should be noted that, when the first PDCCH set includes the at least two PDCCHs, there are the following cases for that the reference resources corresponding to the PDCCHs in the first PDCCH set overlap in time domain. (1) Reference resources corresponding to any two PDCCHs in the first PDCCH set overlap in time domain. (2) A reference resource corresponding to any PDCCH in the first PDCCH set at least overlaps with a reference resource corresponding to another PDCCH in the first PDCCH set in time domain.

It should be noted that, when the second PDCCH set includes the at least two PDCCHs, there are the following cases for that the reference resources corresponding to the PDCCHs in the second PDCCH set overlap in time domain. (1) Reference resources corresponding to any two PDCCHs in the second PDCCH set overlap in time domain. (2) A reference resource corresponding to any PDCCH in the second PDCCH set at least overlaps with a reference resource corresponding to another PDCCH in the second PDCCH set in time domain.

It should be noted that, that the reference resource corresponding to the PDCCH in the first PDCCH set and the reference resource corresponding to the PDCCH in the second PDCCH set do not overlap in time domain means that a reference resource corresponding to any PDCCH in the first PDCCH set does not overlap with a reference resource corresponding to any PDCCH in the second PDCCH set in time domain.

For example, it is assumed that a reference resource 1 corresponding to a PDCCH 1 overlaps with a reference resource 2 corresponding to a PDCCH 2 in time domain, and a reference resource 3 corresponding to a PDCCH 3 does not overlap with the reference resource 1 or the reference resource 2 in time domain. In this case, the first PDCCH set may be {PDCCH 1, PDCCH 2}, and the second PDCCH set may be {PDCCH 3}.

For another example, it is assumed that a reference resource 1 corresponding to a PDCCH 1 and a reference resource 2 corresponding to a PDCCH 2 overlap in time domain, a reference resource 3 corresponding to a PDCCH 3 and a reference resource 4 corresponding to a PDCCH 4 overlap in time domain, and the reference resource 3 and the reference resource 4 do not overlap with the reference resource 1 and the reference resource 2 in time domain. In this case, the first PDCCH set may be {PDCCH 1, PDCCH 2}, and the second PDCCH set may be {PDCCH 3, PDCCH 4}.

For example, descriptions are provided by using an example in which the codebook identification information is the ARI. The terminal determines, based on the ARI of the PDCCH, a reference resource corresponding to the PDCCH. Specifically, the terminal determines, based on the ARI of the PDCCH, an index of the reference resource corresponding to the PDCCH in a reference resource set, to determine the reference resource corresponding to the PDCCH. The reference resource set is a PUCCH resource set indicated by higher-layer configuration information or predefined. For example, when only one PUCCH resource set used to carry an ACK/NACK is configured by a higher layer, the PUCCH resource set is the reference resource set. When a plurality of PUCCH resource sets used to carry an ACK/NACK are configured by a higher layer, the reference resource set is one of the plurality of PUCCH resource sets that is predefined or that is indicated by another higher-layer parameter. For another example, the reference resource set is specially configured by a higher layer, and the reference resource set is irrelevant to a PUCCH resource set that is configured by the higher layer and that is used to carry an ACK/NACK.

S103: The terminal generates a first codebook and a second codebook.

The first codebook corresponds to the first PDCCH set. The second codebook corresponds to the second PDCCH set. Optionally, the first codebook includes ACKs/NACKs corresponding to PDSCHs scheduled by the PDCCHs in the first PDCCH set. The second codebook includes ACKs/NACKs corresponding to PDSCHs scheduled by the PDCCHs in the second PDCCH set.

It should be noted that whether the terminal feeds back an ACK or a NACK for the PDSCH scheduled by the PDCCH depends on whether the terminal can correctly decode the PDSCH scheduled by the PDCCH. In other words, for a PDSCH, if the terminal can correctly decode the PDSCH, the terminal feeds back an ACK to the access network device. If the terminal cannot correctly decode the PDSCH, the terminal feeds back a NACK to the access network device.

Optionally, the first codebook is generated based on DAI information of each PDCCH in the first PDCCH set. The second codebook is generated based on DAI information of each PDCCH in the second PDCCH set.

In a single-carrier (that is, a carrier aggregation technology is not used) scenario, the DAI information includes a $DAI_{counter}$. The $DAI_{counter}$ is used to represent a total quantity of third PDCCHs that meet a first condition and a second condition and that are sent by the access network device until a current PDCCH monitoring occasion. The first condition is that the third PDCCH and a PDCCH sent on the current PDCCH monitoring occasion belong to a same PDCCH set. The second condition is that an ACK/NACK corresponding to a PDSCH scheduled by the third PDCCH and an ACK/NACK corresponding to a PDSCH scheduled by the PDCCH sent on the current PDCCH monitoring occasion are fed back in a same time unit. A value of the $DAI_{counter}$ is updated as the PDCCH monitoring occasion changes.

In a multi-carrier (that is, a carrier aggregation technology is used) scenario, the DAI information includes a $DAI_{counter}$ and a $DAI_{total}$. The $DAI_{counter}$ is used to represent a total quantity of PDCCHs that meet a first condition and a second condition and that are sent by the access network device until a current PDCCH monitoring occasion and a component carrier (Component Carrier, CC). A value of the $DAI_{counter}$ is updated as the PDCCH monitoring occasion and the component carrier change. The $DAI_{total}$ is used to represent a total quantity of PDCCHs that meet the first condition and the second condition and that are sent by the access network device until the current PDCCH monitoring occasion. A value of the $DAI_{total}$ is up dated as the PDCCH monitoring occasion changes.

The following specifically describes step S103 by using an example with reference to an Actual Application Scenario.

Example 1: Single-Carrier Scenario

Figure 5:
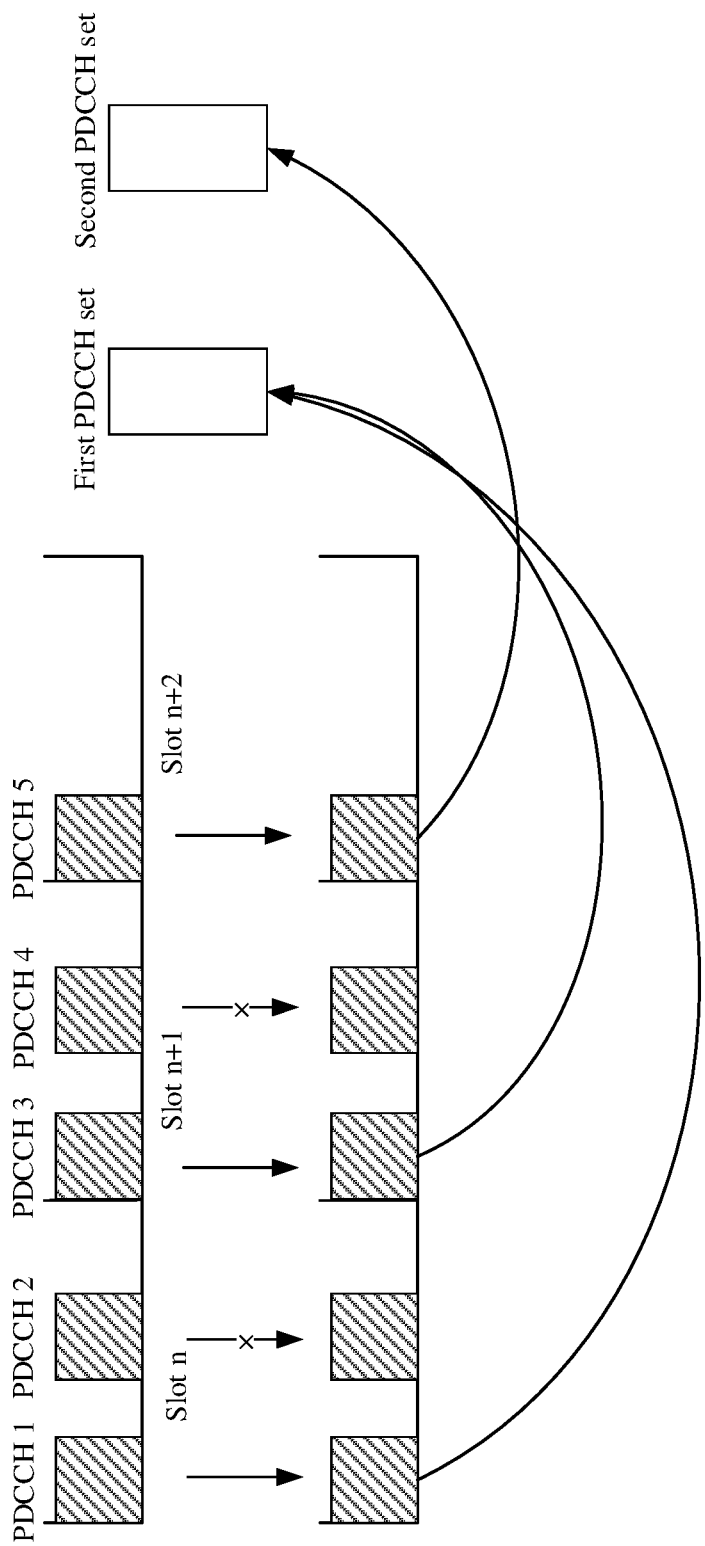
FIG. 5 is a first schematic diagram in which an access network device sends PDCCHs to a terminal according to an embodiment of this application.

Referring to FIG. 5, the access network device sends the PDCCH 1 on a first PDCCH monitoring occasion in a slot n, and sends the PDCCH 2 on a second PDCCH monitoring occasion in the slot n. The PDCCH 1 is used to schedule a PDSCH 1, and an ACK/NACK 1 triggered by the PDSCH 1 is fed back in a slot n+k. The PDCCH 2 is used to schedule a PDSCH 2, and an ACK/NACK 2 triggered by the PDSCH 2 is fed back in the slot n+k. In the PDCCH 1, a value of the $DAI_{counter}$ is 00, and a value of the ARI is 000. In the PDCCH 2, a value of the $DAI_{counter}$ is 01, and a value of the ARI is 000. The terminal correctly parses the PDCCH 1 and misses monitoring the PDCCH 2. The access network device sends the PDCCH 3 on a first PDCCH monitoring occasion in a slot n+1, and sends the PDCCH 4 on a second PDCCH monitoring occasion in the slot n+1. The PDCCH 3 is used to schedule a PDSCH 3, and an ACK/NACK 3 triggered by the PDSCH 3 is fed back in the slot n+k. The PDCCH 4 is used to schedule a PDSCH 4, and an ACK/NACK 4 triggered by the PDSCH 4 is fed back in the slot n+k. In the PDCCH 3, a value of the $DAI_{counter}$ is 10, and a value of the ARI is 000. In the PDCCH 4, a value of the $DAI_{counter}$ is 00, and a value of the ARI is ow. The terminal correctly parses the PDCCH 3 and misses monitoring the PDCCH 4. The access network device sends the PDCCH 5 on a first PDCCH monitoring occasion in a slot n+2. The PDCCH 5 is used to schedule a PDSCH 5, and an ACK/NACK 5 triggered by the PDSCH 5 is fed back in the slot n+k. In the PDCCH 5, a value of the $DAI_{counter}$ is 01, and a value of the ARI is ow. The terminal correctly parses the PDCCH 5. In a slot n+3 to a slot n+k−1, the access network device does not send a PDCCH used to schedule a PDSCH, or the access network device sends a PDCCH, but an ACK/a NACK triggered by a PDSCH scheduled by the PDCCH is not fed back in the slot n+k.

It is assumed that the first preset value and the second preset value of the ARI respectively correspond to the first PDCCH set and the second PDCCH set, and the first preset value and the second preset value are any two of a plurality of preset values configured by a higher layer or predefined. For example, the PDCCH 1 and the PDCCH 3 whose ARI values are 000 belong to the first PDCCH set, and the PDCCH 5 whose ARI value is 010 belongs to the second PDCCH set. In other words, the first PDCCH set is {PDCCH 1, PDCCH 3}, and the second PDCCH set is {PDCCH 5}.

For the first PDCCH set, that the $DAI_{counter}$ in the PDCCH 1 is 00 means that the terminal does not miss monitoring a PDCCH belonging to the first PDCCH set before the PDCCH 1. However, that the $DAI_{counter}$ in the PDCCH 3 is 10 means that the terminal misses monitoring a PDCCH (that is, the PDCCH 2) belonging to the first PDCCH set between the PDCCH 1 and the PDCCH 3, and an ACK/NACK triggered by a PDSCH scheduled by the PDCCH is also fed back in the slot n+k. Therefore, for the first PDCCH set, the first codebook generated by the terminal is {ACK/NACK 1, ACK/NACK 2, ACK/NACK 3}.

For the second PDCCH set, that the $DAI_{counter}$ in the PDCCH 5 is 01 means that the terminal misses monitoring a PDCCH (that is, the PDCCH 4) belonging to the second PDCCH set before the PDCCH 5, and an ACK/NACK triggered by a PDSCH scheduled by the PDCCH is also fed back in the slot n+k. Therefore, for the second PDCCH set, the second codebook generated by the terminal is {ACK/NACK 4, ACK/NACK 5}.

Example 2: Multi-Carrier Scenario

Figure 6:
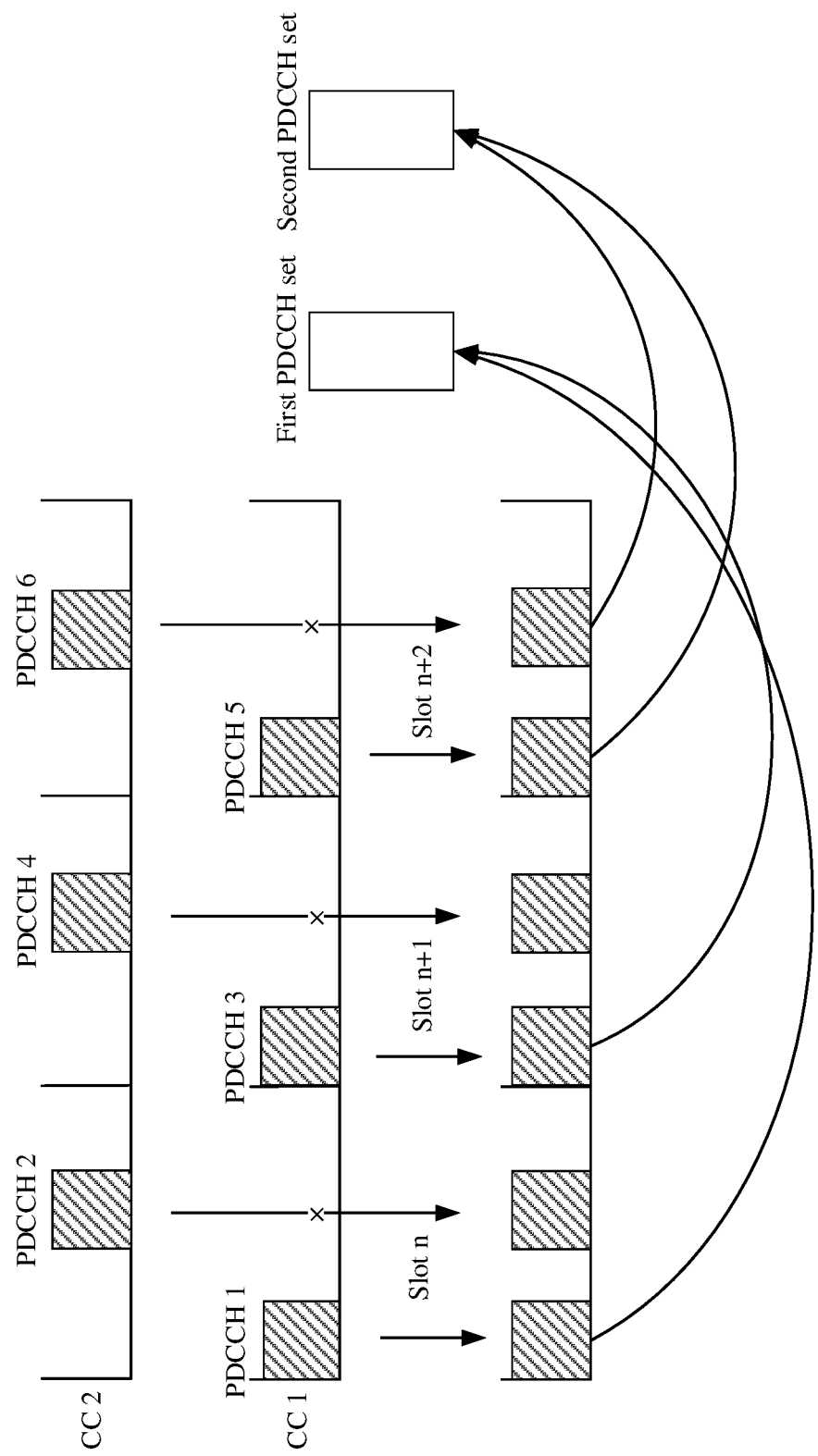
FIG. 6 is a second schematic diagram in which an access network device sends PDCCHs to a terminal according to an embodiment of this application.

Referring to FIG. 6, the access network device sends the PDCCH 1 to the terminal on a CC 1 and sends the PDCCH 2 to the terminal on a CC 2 on a first PDCCH monitoring occasion in a slot n. The PDCCH 1 is used to schedule a PDSCH 1, and an ACK/NACK 1 triggered by the PDSCH 1 is fed back in a slot n+k. The PDCCH 2 is used to schedule a PDSCH 2, and an ACK/NACK 2 triggered by the PDSCH 2 is fed back in the slot n+k. In the PDCCH 1, a value of the $DAI_{counter}$ is 00, a value of the $DAI_{total}$ is 01, and a value of the ARI is 000. In the PDCCH 2, a value of the $DAI_{counter}$ is 01, a value of the $DAI_{total}$ is 01, and a value of the ARI is 000. The terminal correctly parses the PDCCH 1 and misses monitoring the PDCCH 2. The access network device sends the PDCCH 3 on the CC 1 and sends the PDCCH 4 on the CC 2 on a second PDCCH monitoring occasion in the slot n. The PDCCH 3 is used to schedule a PDSCH 3, and an ACK/NACK 3 triggered by the PDSCH 3 is fed back in the slot n+k. The PDCCH 4 is used to schedule a PDSCH 4, and an ACK/NACK 4 triggered by the PDSCH 4 is fed back in the slot n+k. In the PDCCH 3, a value of the $DAI_{counter}$ is 10, a value of the $DAI_{total}$ is 10, and a value of the ARI is 000. In the PDCCH 4, a value of the $DAI_{counter}$ is 00, a value of the $DAI_{total}$ is 00, and a value of the ARI is 010. The terminal correctly parses the PDCCH 3 and misses monitoring the PDCCH 4. The access network device sends a PDCCH 5 on the CC 1 and sends a PDCCH 6 on the CC 2 on a first PDCCH monitoring occasion in a slot n+1. The PDCCH 5 is used to schedule a PDSCH 5, and an ACK/NACK 5 triggered by the PDSCH 5 is fed back in the slot n+k. The PDCCH 6 is used to schedule a PDSCH 6, and an ACK/NACK 6 triggered by the PDSCH 6 is fed back in the slot n+k. In the PDCCH 5, a value of the $DAI_{counter}$ is 01, a value of the $DAI_{total}$ is 10, and a value of the ARI is 010. In the PDCCH 6, a value of the $DAI_{counter}$ is 10, a value of the $DAI_{total}$ is 10, and a value of the ARI is ow. The terminal correctly parses the PDCCH 5 and misses monitoring the PDCCH 6. In a slot n+3 to a slot n+k−1, the access network device does not send a PDCCH used to schedule a PDSCH, or the access network device sends a PDCCH, but an ACK/a NACK triggered by a PDSCH scheduled by the PDCCH is not fed back in the slot n+k.

It is assumed that the first preset value and the second preset value of the ARI respectively correspond to the first PDCCH set and the second PDCCH set, and the first preset value and the second preset value are any two of a plurality of preset values configured by a higher layer or predefined. For example, the PDCCH 1 and the PDCCH 3 whose ARI values are 000 belong to the first PDCCH set, and the PDCCH 5 and the PDCCH 6 whose ARI values are 010 belong to the second PDCCH set. In other words, the first PDCCH set is {PDCCH 1, PDCCH 3}, and the second PDCCH set is {PDCCH 5}.

For the first PDCCH set, the terminal finds that, that the value of the $DAI_{counter}$ in the PDCCH 1 is 00 means that the terminal does not miss monitoring a PDCCH belonging to the first PDCCH set before the PDCCH 1. However, that the value of the $DAI_{total}$ in the PDCCH 1 is 01 and is greater than the value of the DAI means that the terminal misses monitoring counter by 1 a PDCCH (that is, the PDCCH 2) belonging to the first PDCCH set on another carrier in a slot in which the PDCCH 1 is received, and an ACK/NACK triggered by a PDSCH scheduled by the PDCCH is fed back in the slot n+k. That the value of the $DAI_{counter}$ in the PDCCH 3 is continuous with the value of the $DAI_{total}$ in the PDCCH 1, and the value of the $DAI_{counter}$ in the PDCCH 3 is the same as the value of the $DAI_{total}$ in the PDCCH 3 means that the terminal does not miss monitoring a PDCCH belonging to the first PDCCH set in a slot in which the PDCCH 3 is received. Therefore, for the first PDCCH set, the first codebook generated by the terminal is {ACK/NACK 1, ACK/NACK 2, ACK/NACK 3}.

For the second PDCCH set, the terminal finds that, that the $DAI_{counter}$ in the PDCCH 5 is 01 rather than 00 means that the terminal misses monitoring a PDCCH (that is, the PDCCH 4) belonging to the second PDCCH set before the PDCCH 5, and an ACK/NACK triggered by a PDSCH scheduled by the PDCCH is fed back in the slot n+k. In addition, that the value of the $DAI_{total}$ in the PDCCH 5 is 10 and is greater than the value of the $DAI_{counter}$ by 1 means that the terminal misses monitoring a PDCCH (that is, the PDCCH 6) belonging to the second PDCCH set on another carrier in a slot in which the PDCCH 5 is received, and an ACK/NACK triggered by a PDSCH scheduled by the PDCCH is fed back in the slot n+k. Therefore, for the second PDCCH set, the second codebook generated by the terminal is {ACK/NACK 4, ACK/NACK 5, ACK/NACK 6}.

S104: The terminal sends the first codebook and/or the second codebook to the access network device.

Specifically, the terminal sends the first codebook and/or the second codebook in the following implementations.

Manner 1: The terminal separately performs independent coding on the first codebook and the second codebook, and then the terminal separately sends the coded first codebook and the coded second codebook.

Manner 2: The terminal performs joint coding on the first codebook and the second codebook, and then the terminal sends information obtained after the joint coding.

Manner 3: The terminal codes only the first codebook (or codes the second codebook), and then the terminal sends the coded first codebook (or sends the coded second codebook).

In an optional implementation, the terminal sends the first codebook and/or the second codebook in a first time unit. The first time unit is associated with the first PDCCH set, and the first time unit is associated with the second PDCCH set.

That the first time unit is associated with the first PDCCH set means that the first time unit is a time unit in which corresponding ACKs/NACKs are fed back for PDSCHs scheduled by the PDCCHs in the first PDCCH set. Specifically, for any PDCCH in the first PDCCH set, an index of a time unit in which the PDCCH is located plus a first timing offset K0 and a second timing offset K1 is equal to an index of the first time unit. The first timing offset K0 is a difference between indexes of a time unit in which the PDSCH scheduled by the PDCCH is located and a time unit in which the PDCCH is located, and the first timing offset K0 is indicated by a TimeDomainResourceAllocation byte in the PDCCH. The second timing offset K1 is a difference between indexes of a time unit in which the corresponding ACK/NACK is fed back for the PDSCH scheduled by the PDCCH and a time unit in which the PDSCH scheduled by the PDCCH is located, and the second timing offset K1 is indicated by a PDSCH-to-HARQ-Timing byte in the PDCCH. The PDSCH-to-HARQ-Timing byte indicating the second timing offset K1 is generally three bits. For example, a value of the PDSCH-to-HARQ-Timing byte may be 000 to 111. A correspondence between the index offset K1 and the value of the PDSCH-to-HARQ-Timing byte is configured by a higher layer or predefined. For example, the value of the PDSCH-to-HARQ-Timing byte is 001, a corresponding index difference K1 is $a_2$, and $a_2$ is configured by a higher layer or predefined.

For related descriptions regarding that the first time unit is associated with the second PDCCH set, refer to the foregoing content. Details are not described again in this embodiment of this application.

It should be noted that when a time unit associated with the first PDCCH set is different from a time unit associated with the second PDCCH set, the terminal sends the first codebook in the time unit associated with the first PDCCH set, and the terminal sends the second codebook in the time unit associated with the second PDCCH set.

In this embodiment of this application, before step S104 is performed, the terminal determines a first uplink resource based on a quantity of bits of the first codebook and a first ARI value corresponding to the first codebook, and determines a second uplink resource based on a quantity of bits of the second codebook and a second ARI value corresponding to the second codebook. The first uplink resource and the second uplink resource include a PUCCH resource or a physical uplink shared channel (PUSCH) resource. It should be noted that the PUCCH resource includes a time domain location, that is, a start symbol and a symbol length, of the PUCCH. The PUSCH resource also includes a time domain location of a PUSCH.

Optionally, the quantity of bits of the first codebook is determined based on a quantity of bits corresponding to each ACK/NACK included in the first codebook. The quantity of bits of the second codebook is determined based on a quantity of bits corresponding to an ACK/NACK included in the second codebook. The quantity of bits corresponding to the ACK/NACK is configured by a higher layer or predefined. This is not limited in this embodiment of this application.

Optionally, if the first PDCCH set includes only one PDCCH, an ARI value corresponding to the PDCCH is the first ARI value. If the first PDCCH set includes a plurality of PDCCHs, the first ARI value is a value of an ARI corresponding to a last received PDCCH in the first PDCCH set, or the first ARI value is a value of an ARI corresponding to a first received PDCCH in the first PDCCH set, or the first ARI value is the largest one of values of ABIs corresponding to all the PDCCHs in the first PDCCH set, or the first ARI value is the smallest one of values of ABIs corresponding to all the PDCCHs in the first PDCCH set.

Optionally, if the second PDCCH set includes only one PDCCH, an ARI value corresponding to the PDCCH is the second ARI value. If the second PDCCH set includes a plurality of PDCCHs, the second ARI value is a value of an ARI corresponding to a last received PDCCH in the second PDCCH set, or the second ARI value is a value of an ARI corresponding to a first received PDCCH in the second PDCCH set, or the second ARI value is the largest one of values of ARIs corresponding to all the PDCCHs in the second PDCCH set, or the second ARI value is the smallest one of values of ABIs corresponding to all PDCCHs in the second PDCCH set.

Specifically, the terminal determines an index of a first uplink resource set based on the quantity of bits of the first codebook, and the first uplink resource set includes the first uplink resource. Then, the terminal determines an index of the first uplink resource in the first uplink resource set based on the first ARI value corresponding to the first codebook, to determine the first uplink resource. Alternatively, the terminal determines at least one candidate first uplink resource from at least one uplink resource set based on the first ARI value corresponding to the first codebook. Then, the terminal determines the first uplink resource from the at least one candidate first uplink resource based on the quantity of bits of the first codebook.

Further, if uplink resources included in the first uplink resource set is more than total uplink resources that can be indicated by the ARI, for example, the first uplink resource set includes 16 uplink resources, and a bit-width of the ARI is 3, the ARI can indicate only eight uplink resources. In this case, the terminal determines the index of the first uplink resource in the first uplink resource set based on the first ARI value and a start CCE index of a last PDCCH in the first PDCCH set.

It should be noted that an implementation in which the terminal determines the second uplink resource is similar to an implementation in which the terminal determines the first uplink resource. Therefore, for related descriptions of the implementation in which the terminal determines the second uplink resource, refer to the foregoing descriptions of the implementation in which the terminal determines the first uplink resource. Details are not described again in this embodiment of this application.

For example, it is assumed that the access network device configures K+1 PUCCH resource sets for the terminal, where K=2. For a PUCCH resource set k, a corresponding ACK/NACK quantity of bits interval is $[N_k, N_{k+1})$, where k=0, 1, . . . , K−1, $N_0$=1, $N_1$=3, $N_2$=12, and $N_3$ is infinite. A PUCCH resource set 0 includes 16 PUCCH resources, a PUCCH resource set 1 includes 8 PUCCH resources, and a PUCCH resource set 2 includes 8 PUCCH resources. One TB is transmitted on one PDSCH. In other words, one PDSCH carries data of only one TB. In addition, a higher layer configures that the terminal only needs to perform ACK/NACK feedback at a granularity of a TB. It is assumed that the first PDCCH set is {PDCCH 1, PDCCH 2, PDCCH 3}, a value of an ARI of the PDCCH 3 is 000, and the first codebook is {ACK/NACK 1, ACK/NACK 2, ACK/NACK 3}. For the first codebook, the quantity of bits of the first codebook is 3. The terminal can determine, based on the quantity of bits of the first codebook, that the first uplink resource set corresponding to the first codebook is the PUCCH resource set 1. Then, the terminal determines, based on a value 000 of an ARI of a last PDCCH (that is, the PDCCH 3) in the first PDCCH set, that a first PUCCH resource in the PUCCH resource set 1 is the first uplink resource.

After determining the first uplink resource and the second uplink resource, step S104 performed by the terminal includes at least one of the following cases.

Case 1: If the first uplink resource and the second uplink resource do not overlap in time domain, the terminal sends the first codebook on the first uplink resource, and sends the second codebook on the second uplink resource.

Further, if the first uplink resource and the second uplink resource do not overlap in time domain, the first uplink resource and a third uplink resource do not overlap in time domain, and the second uplink resource and the third uplink resource do not overlap in time domain, the terminal sends the first codebook on the first uplink resource, and sends the second codebook on the second uplink resource.

It should be noted that the third uplink resource may be an uplink resource other than the first uplink resource and the second uplink resource, for example, a PUCCH resource carrying a scheduling request SR or channel state information (CSI), or a PUSCH resource carrying uplink data.

Case 2: If the first uplink resource and the second uplink resource do not overlap, the first uplink resource and the third uplink resource do not overlap in time domain, and the second uplink resource and the third uplink resource overlap in time domain, the terminal sends the first codebook on the first uplink resource. In addition, the terminal may further perform any one of the following operations.

(1-1) The terminal sends the second codebook on the second uplink resource. In addition, the terminal cancels sending of third uplink information on the third uplink resource. It should be noted that the third uplink information is information to be sent on the third uplink resource.

(1-2) The terminal sends the third uplink information on the third uplink resource. In addition, the terminal cancels sending of the second codebook on the second uplink resource.

(1-3) When a fourth uplink resource and the first uplink resource do not overlap in time domain, the terminal sends fourth uplink information on the fourth uplink resource. The fourth uplink information is generated by jointly coding the second codebook and the third uplink information. The fourth uplink resource is determined based on one or more of a type of the third uplink information, a value of the third uplink information, a first quantity of bits, and the second ARI value. The first quantity of bits is a sum of the quantity of bits of the second codebook and a quantity of bits of the third uplink information. For example, when the third uplink resource is a PUSCH carrying uplink data, the fourth uplink resource is the third uplink resource. For another example, if the third uplink resource is a PUCCH carrying an SR, the fourth uplink resource is one of the second uplink resource and the third uplink resource. For another example, if the third uplink resource is a PUCCH carrying CSI, the fourth uplink resource is determined based on the first quantity of bits (that is, a total quantity of bits of the second codebook and the CSI) and the second ARI value. A specific determining method is similar to the foregoing second uplink resource determining method, and details are not described herein again.

It should be noted that, if the fourth uplink resource and the first uplink resource overlap in time domain, the terminal may perform the operation (1-1) or the operation (1-2).

It should be noted that the first uplink resource and the second uplink resource do not overlap, the first uplink resource and the third uplink resource overlap in time domain, and the second uplink resource and the third uplink resource do not overlap in time domain. A processing method in this case is similar to that in the foregoing case 2, and details are not described herein again.

Case 3: If the first uplink resource and the second uplink resource do not overlap in time domain, the first uplink resource and the third uplink resource overlap in time domain, and the second uplink resource and the third uplink resource overlap in time domain, the terminal may perform the following operations.

(2-1) The terminal sends the first codebook on the first uplink resource, and sends the second codebook on the second uplink resource.

(2-2) The terminal sends fifth uplink information on a fifth uplink resource. The fifth uplink information is generated by jointly coding the first codebook, the second codebook, and the third uplink information. The fifth uplink resource is determined based on one or more of the type of the third uplink information, the value of the third uplink information, a second quantity of bits, and a third ARI. The second quantity of bits is a sum of the quantity of bits of the first codebook, the quantity of bits of the second codebook, and the quantity of bits of the third uplink information. A value of the third ARI is a value of an ARI corresponding to a last received PDCCH in the first PDCCH set and the second PDCCH set. For example, when the third uplink resource is a PUSCH carrying uplink data, the fifth uplink resource is the third uplink resource. For another example, if the third uplink resource is a PUCCH carrying an SR, the fifth uplink resource is one of the first uplink resource, the second uplink resource, and the third uplink resource. For another example, if the third uplink resource is a PUCCH carrying CSI, the fifth uplink resource is determined based on the second quantity of bits (that is, a total quantity of bits of the first codebook, the second codebook, and the CSI) and the third ARI value. A specific determining method is similar to the foregoing first uplink resource determining method, and details are not described herein again.

(2-3) The terminal sends the third uplink information on the third uplink resource. In addition, the terminal cancels sending of the first codebook on the first uplink resource, and cancels sending of the second codebook on the second uplink resource.

Case 4: If the first uplink resource and the second uplink resource overlap in time domain, the terminal may perform any one of the following operations.

(3-1) The terminal sends the first codebook on the first uplink resource. In addition, the terminal cancels sending of the second codebook on the second uplink resource.

(3-2) The terminal sends the second codebook on the second uplink resource. In addition, the terminal cancels sending of the first codebook on the first uplink resource.

(3-3) The terminal sends sixth uplink information on a sixth uplink resource. The sixth uplink information is generated by jointly coding the first codebook and the second codebook. The sixth uplink resource is determined based on a third quantity of bits and the third ARI value. The third quantity of bits is a sum of the quantity of bits of the first codebook and the quantity of bits of the second codebook, and the third ARI value is a value of an ARI corresponding to a last received PDCCH in the first PDCCH set and the second PDCCH set.

It should be noted that, in an actual application, the terminal may determine, based on a priority of the first codebook and a priority of the second codebook, whether the terminal performs the operation (3-1) or the operation (3-2). To be specific, when the priority of the first codebook is higher than the priority of the second codebook, the terminal performs the foregoing operation (3-1). On the contrary, when the priority of the second codebook is higher than the priority of the first codebook, the terminal performs the foregoing operations (3-2).

It should be noted that the priority of the first codebook and the priority of the second codebook are configured by a higher layer or predefined. Optionally, the terminal compares the priority of the first codebook with the priority of the second codebook based on one or more of the following information: a mapping type (mapping type) of a PDSCH corresponding to the first codebook and/or the second codebook or a time domain length of a PDSCH corresponding to the first codebook and/or the second codebook. For example, when the first codebook corresponds to a mapping type B, the priority of the first codebook is higher than the priority of the second codebook. For another example, when the time domain length of the PDSCH corresponding to the first codebook is less than or equal to a preset value, the priority of the first codebook is higher than the priority of the second codebook.

The actions in steps S101 to S104 may be performed by the processor 301 in the terminal 30 shown in FIG. 3 by invoking the application program code stored in the memory 302. The actions in steps S101, S102, and S104 may be performed by the processor 201 in the access network device 20 shown in FIG. 3 by invoking the application program code stored in the memory 202. This is not limited in this embodiment of this application.

The foregoing mainly describes the solutions provided in the embodiments of this application from perspectives of the terminal and the access network device. It may be understood that to implement the foregoing functions, the terminal includes corresponding hardware structures or software modules for performing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or driving hardware by computer software depends on particular applications and design constraints of the technical solutions. A person skilled in the art may use a different method to implement the described functions for each particular application, but it should not be considered that the implementation goes beyond the scope of this application.

In the embodiments of this application, the terminal may be divided into function modules based on the foregoing method examples. For example, function modules corresponding to the functions may be obtained through division, or two or more functions may be integrated into one processing module. The integrated module may be implemented in a form of hardware, or may be implemented in a form of a software function module. It should be noted that division into modules in the embodiments of this application is an example, and is merely a logical function division. In actual implementation, another division manner may be used.

Figure 7:
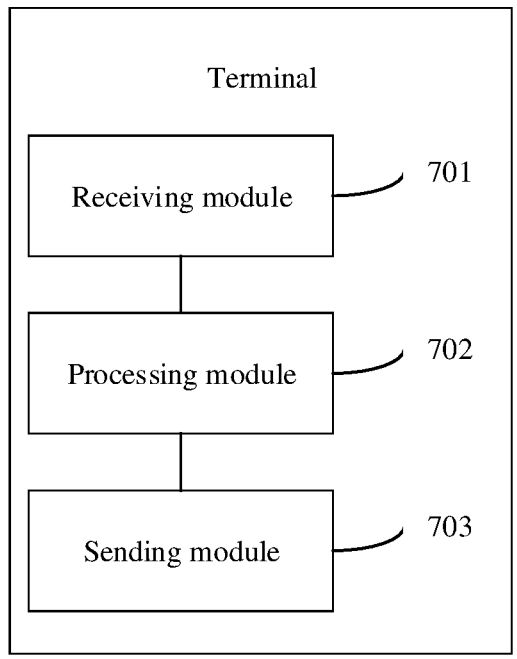
FIG. 7 is a schematic structural diagram of a terminal device according to an embodiment of this application.

For example, when function modules are obtained through division based on corresponding functions, FIG. 7 is a schematic structural diagram of a terminal. The terminal includes a receiving module 701, a processing module 702, and a sending module 703.

The receiving module 701 is configured to receive physical downlink control channels PDCCHs, where the PDCCHs are used to schedule physical downlink shared channel PDSCHs, and the PDCCHs include a first PDCCH set and a second PDCCH set.

The processing module 702 is configured to generate a first codebook and a second codebook, where the first codebook corresponds to the first PDCCH set, the second codebook corresponds to the second PDCCH set, and the first PDCCH set and the second PDCCH set correspond to different values of codebook identification information of the PDCCHs.

The sending module 703 is configured to send the first codebook and/or the second codebook.

In a possible design, the sending module 703 is further configured to send the first codebook and/or the second codebook in a first time unit, where the first time unit is associated with the first PDCCH set, and the first time unit is associated with the second PDCCH set.

Optionally, the codebook identification information includes at least one or any combination of the following: an acknowledgement/negative acknowledgement resource indicator (ARI), a downlink control information (DCI) format, a radio network temporary identifier, first indication information of DCI, a PDCCH monitoring occasion, a search space identifier, and a control resource set identifier.

Optionally, that the first PDCCH set and the second PDCCH set correspond to different values of codebook identification information of the PDCCHs includes a value of codebook identification information of each PDCCH in the first PDCCH set is a first preset value, a value of codebook identification information of each PDCCH in the second PDCCH set is a second preset value, and the first preset value is different from the second preset value.

Optionally, that the first PDCCH set and the second PDCCH set correspond to different values of codebook identification information of the PDCCHs includes a value of codebook identification information of each PDCCH in the first PDCCH set belongs to a first value set, a value of codebook identification information of each PDCCH in the second PDCCH set belongs to a second value set, and the value in the first value set is different from the value in the second value set.

Optionally, the first codebook is generated based on downlink assignment index (DAI) information of each PDCCH in the first PDCCH set, and the second codebook is generated based on DAI information of each PDCCH in the second PDCCH set.

In a possible design, the processing module 702 is further configured to determine a first uplink resource based on a quantity of bits of the first codebook and a first ARI value corresponding to the first codebook, where the first ARI value is a value of an ARI corresponding to a last received PDCCH in the first PDCCH set, and determine a second uplink resource based on a quantity of bits of the second codebook and a second ARI value corresponding to the second codebook, where the second ARI value is a value of an ARI corresponding to a last received PDCCH in the second PDCCH set.

In a possible design, the sending module 703 is configured to when the first uplink resource and the second uplink resource do not overlap in time domain, send the first codebook on the first uplink resource, and send the second codebook on the second uplink resource.

In a possible design, the sending module 703 is configured to when the first uplink resource and the second uplink resource do not overlap in time domain, the first uplink resource and a third uplink resource do not overlap in time domain, and the second uplink resource and the third uplink resource overlap in time domain, send the first codebook on the first uplink resource, and send the second codebook on the second uplink resource, or send third uplink information on the third uplink resource, or send fourth uplink information on a fourth uplink resource, where the fourth uplink information is generated by jointly coding the second codebook and the third uplink information corresponding to the third uplink resource, and the fourth uplink resource and the first uplink resource do not overlap in time domain.

In a possible design, the sending module 703 is configured to when the first uplink resource and the second uplink resource do not overlap in time domain, the first uplink resource and a third uplink resource overlap in time domain, and the second uplink resource and the third uplink resource overlap in time domain, send the first codebook on the first uplink resource, and send the second codebook on the second uplink resource, or send fifth uplink information on a fifth uplink resource, where the fifth uplink information is generated by jointly coding the first codebook, the second codebook, and third uplink information corresponding to the third uplink resource.

In a possible design, the sending module 703 is configured to when the first uplink resource and the second uplink resource overlap in time domain, send the first codebook on the first uplink resource, or send the second codebook on the second uplink resource, or send sixth uplink information on a sixth uplink resource, where the sixth uplink information is generated by jointly coding the first codebook and the second codebook.

In this embodiment of this application, the apparatus is presented in a form in which function modules are obtained through division based on corresponding functions, or the apparatus is presented in a form in which the function modules are divided in an integrated manner. The "module" herein may include an application-specific integrated circuit (ASIC), a circuit, a processor executing one or more software or firmware programs, a memory, an integrated logic circuit, or another component that can provide the foregoing function. For example, the processing module 702 in FIG. 7 may be implemented by the processor in the terminal in FIG. 3. The receiving module 701 and the sending module 703 in FIG. 7 may be implemented by the communications interface in the terminal in FIG. 3. This is not limited in this embodiment of this application.

An embodiment of this application further provides a computer-readable storage medium. The computer-readable storage medium stores an instruction. When the computer-readable storage medium is run on the terminal shown in FIG. 3, the terminal is enabled to perform the uplink control information transmission method shown in FIG. 4 in the embodiments of this application.

Optionally, an embodiment of this application provides a chip system. The chip system includes a processor, configured to support a terminal in implementing the uplink control information transmission method shown in FIG. 4. In a possible design, the chip system further includes a memory. The memory is configured to store a program instruction and data that are necessary for a receiver. Certainly, the memory may not exist in the chip system. The chip system may include a chip, or may include a chip and another discrete device. This is not specifically limited in this embodiment of this application.

Figure 8:
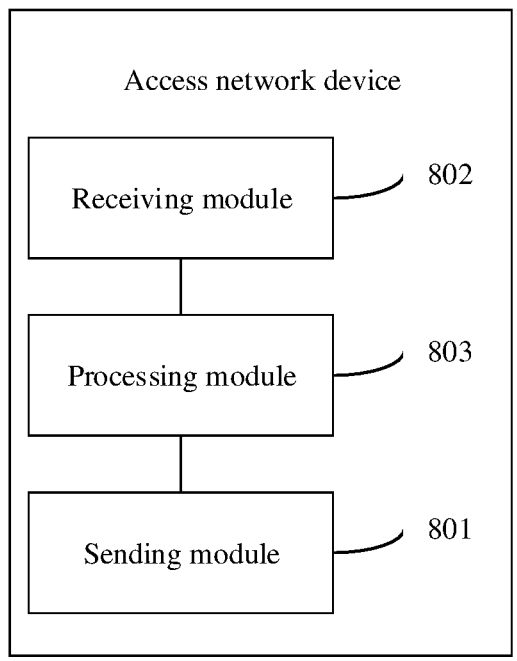
FIG. 8 is a schematic structural diagram of an access network device according to an embodiment of this application.

For example, when function modules are obtained through division based on corresponding functions, FIG. 8 is a schematic structural diagram of an access network device. The access network device includes a sending module 801, a receiving module 802, and a processing module 803.

The sending module 801 is configured to send physical downlink control channels PDCCHs, where the PDCCHs are used to schedule physical downlink shared channel PDSCHs, and the PDCCHs include a first PDCCH set and a second PDCCH set.

The receiving module 802 is configured to receive a first codebook and/or a second codebook, where the first codebook corresponds to the first PDCCH set, the second codebook corresponds to the second PDCCH set, and the first PDCCH set and the second PDCCH set correspond to different values of codebook identification information of the PDCCHs.

In a possible design, the receiving module 802 is configured to receive the first codebook and/or the second codebook in a first time unit, where the first time unit is associated with the first PDCCH set, and the first time unit is associated with the second PDCCH set.

Optionally, the codebook identification information includes at least one or any combination of the following: an ARI, a downlink control information DCI format, an RNTI, first indication information of DCI, a PDCCH monitoring occasion, a search space identifier, and a control resource set identifier.

Optionally, that the first PDCCH set and the second PDCCH set correspond to different values of codebook identification information of the PDCCHs includes a value of codebook identification information of each PDCCH in the first PDCCH set is a first preset value, a value of codebook identification information of each PDCCH in the second PDCCH set is a second preset value, and the first preset value is different from the second preset value.

Optionally, that the first PDCCH set and the second PDCCH set correspond to different values of codebook identification information of the PDCCHs includes a value of codebook identification information of each PDCCH in the first PDCCH set belongs to a first value set, a value of codebook identification information of each PDCCH in the second PDCCH set belongs to a second value set, and the value in the first value set is different from the value in the second value set.

Optionally, the first codebook is generated based on downlink assignment index DAI information of each PDCCH in the first PDCCH set, and the second codebook is generated based on DAI information of each PDCCH in the second PDCCH set.

In a possible design, the processing module 803 is configured to determine a first uplink resource based on a quantity of bits of the first codebook and a first ARI value corresponding to the first codebook, where the first ARI value is a value of an ARI corresponding to a last received PDCCH in the first PDCCH set, and determine a second uplink resource based on a quantity of bits of the second codebook and a second ARI value corresponding to the second codebook, where the second ARI value is a value of an ARI corresponding to a last received PDCCH in the second PDCCH set.

In a possible design, the receiving module 802 is configured to when the first uplink resource and the second uplink resource do not overlap in time domain, receive the first codebook on the first uplink resource, and receive the second codebook on the second uplink resource.

In a possible design, the receiving module 802 is configured to when the first uplink resource and the second uplink resource overlap in time domain, receive the first codebook on the first uplink resource, or receive the second codebook on the second uplink resource, or receive sixth uplink information on a sixth uplink resource, where the sixth uplink information is generated by jointly coding the first codebook and the second codebook.

In this embodiment of this application, the apparatus is presented in a form in which function modules are obtained through division based on corresponding functions, or the apparatus is presented in a form in which the function modules are divided in an integrated manner. The "module" herein may include an application-specific integrated circuit (ASIC), a circuit, a processor executing one or more software or firmware programs, a memory, an integrated logic circuit, or another component that can provide the foregoing function. For example, the processing module 803 in FIG. 8 may be implemented by the processor in the access network device in FIG. 3. The receiving module 802 and the sending module 801 in FIG. 8 may be implemented by the communications interface in the access network device in FIG. 3. This is not limited in this embodiment of this application.

An embodiment of this application further provides a computer-readable storage medium. The computer-readable storage medium stores an instruction. When the computer-readable storage medium is run on the access network device shown in FIG. 3, the access network device is enabled to perform the uplink control information transmission method shown in FIG. 4 in the embodiments of this application.

Optionally, an embodiment of this application provides a chip system. The chip system includes a processor, configured to support an access network device in implementing the uplink control information transmission method shown in FIG. 4. In a possible design, the chip system further includes a memory. The memory is configured to store a program instruction and data that are necessary for a receiver. Certainly, the memory may not exist in the chip system. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or the functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, the disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, the specification and the accompanying drawings are merely example descriptions of this application defined by the appended claims, and are considered as any of or all modifications, variations, combinations or equivalents that cover the scope of this application. Definitely, a person skilled in the art can make various modifications and variations to this application without departing from the spirit and scope of this application. In this way, this application is intended to cover these modifications and variations provided that these modifications and variations of this application fall within the scope of the claims of this application and their equivalent technologies.

What is claimed is:

1. A communications apparatus, comprising
a processor; and
a memory storing a computer program for execution by the processor, the computer program including instructions for:
receiving physical downlink control channels (PDCCHs) from a network device, wherein the PDCCHs are used to schedule physical downlink shared channels (PDSCHs), and wherein the PDCCHs comprise one or more PDCCHs in a first PDCCH set and one or more PDCCHs in a second PDCCH set, each of the PDCCHs being configured with codebook identification information, respectively;

generating a first hybrid automatic repeat request (HARQ) acknowledgement (ACK) codebook and a second HARQ ACK codebook, wherein the first HARQ ACK codebook corresponds to the first PDCCH set, wherein the second HARQ ACK codebook corresponds to the second PDCCH set, and wherein the first PDCCH set and the second PDCCH set are distinguished by the codebook identification information of the PDCCHs of the first PDCCH set having values different from the codebook identification information of the PDCCHs of the second PDCCH set; and sending one or both of the first HARQ ACK codebook and the second HARQ ACK codebook to a network device.

2. The apparatus according to claim 1, wherein the instructions for sending the one or both of the first HARQ ACK codebook and the second HARQ ACK codebook include instructions for:

sending the one or both of the first HARQ ACK codebook and the second HARQ ACK codebook in a first time unit, wherein the first time unit is associated with the first PDCCH set, and wherein the first time unit is associated with the second PDCCH set.

3. The apparatus according to claim 1, wherein the codebook identification information comprises at least one of an acknowledgement/negative acknowledgement resource indicator (ARI), a downlink control information (DCI) format, a radio network temporary identifier, first indication information of DCI, a PDCCH monitoring occasion, a search space identifier, or a control resource set identifier.

4. The apparatus according to claim 1, wherein a first value of codebook identification information of each PDCCH in the first PDCCH set is a first preset value, wherein a second value of codebook identification information of each PDCCH in the second PDCCH set is a second preset value, and wherein the first preset value is different from the second preset value.

5. The apparatus according to claim 1, wherein a first value of codebook identification information of each PDCCH in the first PDCCH set belongs to a first value set, wherein a second value of codebook identification information of each PDCCH in the second PDCCH set belongs to a second value set, and wherein the first value in the first value set is different from the second value in the second value set.

6. The apparatus according to claim 1, wherein the first HARQ ACK codebook is generated based on downlink assignment index (DAI) information of each PDCCH in the first PDCCH set, and wherein the second HARQ ACK codebook is generated based on DAI information of each PDCCH in the second PDCCH set.

7. The apparatus according to claim 1, wherein the program further includes instructions for:

determining a first uplink resource based on a quantity of bits of the first HARQ ACK codebook and a first acknowledgement/negative acknowledgement resource indicator (ARI) value corresponding to the first HARQ ACK codebook, wherein the first ARI value is a value of an ARI corresponding to a last received PDCCH in the first PDCCH set; and determining a second uplink resource based on a quantity of bits of the second HARQ ACK codebook and a second ARI value corresponding to the second HARQ ACK codebook, wherein the second ARI value is a value of an ARI corresponding to a last received PDCCH in the second PDCCH set.

8. The apparatus according to claim 1, wherein a first uplink resource and a second uplink resource do not overlap in a time domain; and wherein the instructions for sending the one or both of the first HARQ ACK codebook and the second HARQ ACK codebook include instructions for sending the first HARQ ACK codebook on the first uplink resource, and sending the second HARQ ACK codebook on the second uplink resource.

9. The apparatus according to claim 1, wherein a first uplink resource and a second uplink resource overlap in a time domain; and wherein the instructions for sending the one or both of the first HARQ ACK codebook and the second HARQ ACK codebook include instructions for performing at least one of sending the first HARQ ACK codebook on the first uplink resource, or sending the second HARQ ACK codebook on the second uplink resource.

10. The apparatus according to claim 9, wherein the instructions for sending the one or both of the first HARQ ACK codebook or the second HARQ ACK codebook include instructions for:

performing, in response to a priority of the first HARQ ACK codebook being higher that a priority of the second HARQ ACK codebook, sending the first HARQ ACK codebook on the first uplink resource, and not sending the second HARQ ACK codebook on the second uplink resource;

performing, in response to the priority of the first HARQ ACK codebook being lower that the priority of the second HARQ ACK codebook, sending the second HARQ ACK codebook on the second uplink resource, and not sending the first HARQ ACK codebook on the first uplink resource.

11. A communications apparatus, comprising:

a processor, and a memory storing a computer program for execution by the processor, the computer program including instructions for:

sending physical downlink control channels (PDCCHs) to a terminal device, wherein the PDCCHs are used to schedule physical downlink shared channels (PDSCHs), and wherein the PDCCHs comprise one or more PDCCHs in a first PDCCH set and one or more PDCCHs in a second PDCCH set, each of the PDCCHs being configured with codebook identification information respectively; and receiving one or both of a first hybrid automatic repeat request (HARQ) acknowledgement (ACK) codebook and a second HARQ ACK codebook, wherein the first HARQ ACK codebook corresponds to the first PDCCH set, wherein the second HARQ ACK codebook corresponds to the second PDCCH set, and wherein the first PDCCH set and the second PDCCH set are distinguished by the codebook identification information of the PDCCHs of the first PDCCH set having values different from the codebook identification information of the PDCCHs of the second PDCCH set.

12. The apparatus according to claim 11, wherein the instructions for receiving one or both of the first HARQ ACK codebook and the second HARQ ACK codebook include instructions for:

receiving the one or both of the first HARQ ACK codebook and the second HARQ ACK codebook in a first time unit, wherein the first time unit is associated with the first PDCCH set, and wherein the first time unit is associated with the second PDCCH set.

13. The apparatus according to claim 11, wherein the codebook identification information comprises at least one of an acknowledgement/negative acknowledgement resource indicator (ARI), a downlink control information (DCI) format, a radio network temporary identifier, first indication information of DCI, a PDCCH monitoring occasion, a search space identifier, or a control resource set identifier.

14. The apparatus according to claim 11, wherein a first value of codebook identification information of each PDCCH in the first PDCCH set is a first preset value, wherein a second value of codebook identification information of each PDCCH in the second PDCCH set is a second preset value, and wherein the first preset value is different from the second preset value.

15. The apparatus according to claim 11, wherein a first value of codebook identification information of each PDCCH in the first PDCCH set belongs to a first value set, wherein a second value of codebook identification information of each PDCCH in the second PDCCH set belongs to a second value set, and wherein the first value in the first value set is different from the second value in the second value set.

16. The apparatus according to claim 11, wherein the first HARQ ACK codebook is generated based on downlink assignment index (DAI) information of each PDCCH in the first PDCCH set, and wherein the second HARQ ACK codebook is generated based on DAI information of each PDCCH in the second PDCCH set.

17. The apparatus according to claim 11, wherein a first uplink resource and a second uplink resource do not overlap in a time domain; and
wherein the instructions for receiving the one or both of the first HARQ ACK codebook and the second HARQ ACK codebook include instructions for:
receiving the first HARQ ACK codebook on the first uplink resource, and receiving the second HARQ ACK codebook on the second uplink resource.

18. The apparatus according to claim 11, wherein a first uplink resource and a second uplink resource overlap in a time domain; and
wherein the instructions for receiving the one or both of the first HARQ ACK codebook and the second HARQ ACK codebook include instructions for performing at least one of:
receiving the first HARQ ACK codebook on the first uplink resource; or
receiving the second HARQ ACK codebook on the second uplink resource.

19. The apparatus according to claim 18, wherein the instructions for wherein the instructions for receiving the one or both of the first HARQ ACK codebook and the second HARQ ACK codebook include instructions for performing at least one of receiving the first HARQ ACK codebook on the first uplink resource or receiving the second HARQ ACK codebook on the second uplink resource include instructions for:
receiving the first HARQ ACK codebook on the first uplink resource in response to a priority of the first HARQ ACK codebook being higher than a priority of the second HARQ ACK codebook, and not receiving the second HARQ ACK codebook on the second uplink resource;
receiving the second HARQ ACK codebook on the second uplink resource in response to the priority of the first HARQ ACK codebook being lower than the priority of the second HARQ ACK codebook, and not receive the first HARQ ACK codebook on the first uplink resource.

20. An uplink control information transmission method, comprising:
receiving physical downlink control channels (PDCCHs) from a network device, wherein the PDCCHs are used to schedule physical downlink shared channel (PDSCHs), and wherein the PDCCHs comprise one or more PDCCHs in a first PDCCH set and one or more PDCCHs in a second PDCCH set, each of the PDCCHs being configured with codebook identification information, respectively;
generating a first hybrid automatic repeat request (HARQ) acknowledgement (ACK) codebook and a second HARQ ACK codebook, wherein the first codebook corresponds to the first PDCCH set, wherein the second HARQ ACK codebook corresponds to the second PDCCH set, and wherein the first PDCCH set and the second PDCCH set are distinguished by the codebook identification information of the PDCCHs of the first PDCCH set having values different from the codebook identification information of the PDCCHs of the second PDCCH set; and
sending one or both of the first HARQ ACK codebook and the second HARQ ACK codebook to a network device.

* * * * *

UNITED STATES PATENT AND TRADEMARK OFFICE
CERTIFICATE OF CORRECTION

PATENT NO. : 11,528,734 B2
APPLICATION NO. : 17/098721
DATED : December 13, 2022
INVENTOR(S) : Li It is certified that error appears in the above-identified patent and that said Letters Patent is hereby corrected as shown below:

In the Specification

Column 11, Line 66; delete "ABIs" and insert --ARIs--.

Column 16, Line 45; delete "up dated" and insert --updated--.

Column 17, Line 7; delete "ow" and insert --010--.

Column 17, Line 14; delete "ow" and insert --010--.

Column 18, Line 19; delete "ow" and insert --010--.

Column 18, Line 43; delete "counter by 1".

Column 20, Line 23; delete "ABIs" and insert --ARIs--.

Column 20, Line 25; delete "ABIs" and insert --ARIs--.

Column 20, Line 37; delete "ABIs" and insert --ARIs--.

Signed and Sealed this
Seventeenth Day of January, 2023

Katherine Kelly Vidal
*Director of the United States Patent and Trademark Office*